United States Patent
Vigeant et al.

(10) Patent No.: US 11,956,701 B2
(45) Date of Patent: Apr. 9, 2024

(54) CONTENT DISPLAY AND INTERACTION ACCORDING TO ESTIMATES OF CONTENT USEFULNESS

(71) Applicant: Oracle International Corporation, Redwood Shores, CA (US)

(72) Inventors: Jacques Vigeant, Fort Lauderdale, FL (US); Wai On Lee, Foster City, CA (US); Dustin Bauder, Broomfield, CO (US); Reginald A. Hansbrough, Aurora, IL (US); Ananth Nararyanan Venkata, San Ramon, CA (US); Narayan Madhavan Nayar, Oak Park, IL (US)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 16/689,996

(22) Filed: Nov. 20, 2019

(65) Prior Publication Data

US 2020/0092695 A1 Mar. 19, 2020

Related U.S. Application Data

(63) Continuation of application No. 15/273,567, filed on Sep. 22, 2016, now Pat. No. 10,516,980.

(Continued)

(51) Int. Cl.
*H04W 4/50* (2018.01)
*H04N 7/15* (2006.01)
(Continued)

(52) U.S. Cl.
CPC ............... *H04W 4/50* (2018.02); *H04N 7/15* (2013.01); *H04N 21/60* (2013.01); *H04W 4/025* (2013.01)

(58) Field of Classification Search
CPC .......... H04W 4/50; H04W 4/025; H04N 7/15; H04N 21/60
(Continued)

(56) References Cited

U.S. PATENT DOCUMENTS

| 5,418,948 A | 5/1995 | Turtle |
| 7,047,242 B1 | 5/2006 | Ponte |

(Continued)

OTHER PUBLICATIONS

Data sources for Power BI service, Microsoft Power BI, https://powerbi.microsoft.com/en-us/documentation/powerbi-service-get-data/,2015, 7 pages, retrieved on Mar. 10, 2016.

(Continued)

*Primary Examiner* — David R Lazaro
*Assistant Examiner* — Mariegeorges A Henry
(74) *Attorney, Agent, or Firm* — Trellis IP Law Group, PC

(57) ABSTRACT

An example system and method for selectively conveying content via User Interface (UI) display screen sections of Business Intelligence (BI) software and for facilitating user interaction therewith, e.g., so as to impart usefulness or preference ratings thereto, which can then affect subsequently displayed content. An example method includes providing one or more UI controls enabling a user to provide an input query and to interact with resulting content (i.e., query results, also called search results), where the user interaction with the content provides information (e.g., context information) indicative of a usefulness or preference rating pertaining to the content; thereby enabling modifications to subsequently retrieved content in accordance with the usefulness or preference rating(s). Such rating(s) may be aggregated from plural users of an associated software application. Additional UI controls may provide options to selectively share relevant retrieved content with other users, (Continued)

such as nearby users that have the appropriate permissions to view the shared content.

20 Claims, 16 Drawing Sheets

Related U.S. Application Data

(60) Provisional application No. 62/246,031, filed on Oct. 24, 2015.

(51) Int. Cl.
*H04N 21/60* (2011.01)
*H04W 4/02* (2018.01)

(58) Field of Classification Search
USPC .................................................. 709/205, 220
See application file for complete search history.

(56) References Cited

U.S. PATENT DOCUMENTS

| | | | |
|---|---|---|---|
| 7,802,195 B2 | 9/2010 | Saul | |
| 8,533,619 B2 | 9/2013 | Baier | |
| 8,788,514 B1 | 7/2014 | Ramanarayanan | |
| 8,954,446 B2 | 2/2015 | Igeta | |
| 8,966,386 B2 | 2/2015 | Fok | |
| 9,092,802 B1 | 7/2015 | Akella | |
| 9,098,183 B2 | 8/2015 | Vonshk | |
| 9,179,061 B1 | 11/2015 | Kraft | |
| 9,338,652 B1 | 5/2016 | Allen | |
| 9,501,585 B1* | 11/2016 | Gautam | G06F 16/26 |
| 9,582,913 B1 | 2/2017 | Kraft | |
| 9,870,629 B2 | 1/2018 | Cardno | |
| 10,048,854 B2 | 8/2018 | Zhang | |
| 2003/0171911 A1* | 9/2003 | Fairweather | G06F 9/4493 |
| | | | 704/2 |
| 2005/0060286 A1 | 3/2005 | Hansen | |
| 2005/0076085 A1 | 4/2005 | Budd | |
| 2006/0168544 A1* | 7/2006 | Zaner | G06N 7/005 |
| | | | 715/836 |
| 2007/0279484 A1 | 12/2007 | Derocher | |
| 2008/0118916 A1 | 5/2008 | Siegemund | |
| 2008/0233980 A1 | 9/2008 | Englund | |
| 2009/0327263 A1 | 12/2009 | Maghoul | |
| 2010/0070448 A1 | 3/2010 | Omoigui | |
| 2011/0055241 A1 | 3/2011 | Lewis | |
| 2011/0081948 A1 | 4/2011 | Shirai | |
| 2011/0123115 A1 | 5/2011 | Lee | |
| 2011/0249900 A1 | 10/2011 | Thorn | |
| 2012/0066602 A1 | 3/2012 | Chai | |
| 2012/0084689 A1 | 4/2012 | Ledet | |
| 2012/0088543 A1 | 4/2012 | Lindner | |
| 2012/0110565 A1 | 5/2012 | O'Sullivan | |
| 2012/0134590 A1 | 5/2012 | Pelrou | |
| 2012/0240025 A1* | 9/2012 | Migos | G06F 3/0488 |
| | | | 715/230 |
| 2012/0240220 A1* | 9/2012 | Smith | G06F 21/84 |
| | | | 726/17 |
| 2012/0259833 A1 | 10/2012 | Paduroiu | |
| 2012/0289290 A1 | 11/2012 | Chae | |
| 2012/0311074 A1 | 12/2012 | Arini | |
| 2012/0323910 A1 | 12/2012 | Llyas et al. | |
| 2013/0006904 A1 | 1/2013 | Horvitz | |
| 2013/0042259 A1 | 2/2013 | Urbach | |
| 2013/0113943 A1 | 5/2013 | Wormald | |
| 2013/0117319 A1 | 5/2013 | Soltani | |
| 2013/0124965 A1* | 5/2013 | Elias | G06F 16/904 |
| | | | 715/230 |
| 2014/0040977 A1 | 2/2014 | Barton | |
| 2014/0108793 A1 | 4/2014 | Barton | |
| 2014/0172408 A1 | 6/2014 | Vukosavljek | |
| 2014/0280071 A1* | 9/2014 | Nemer | G06Q 30/0214 |
| | | | 707/722 |
| 2015/0012830 A1 | 1/2015 | Choi | |
| 2015/0012854 A1 | 1/2015 | Choi | |
| 2015/0026145 A1 | 1/2015 | Prakash | |
| 2015/0026153 A1 | 1/2015 | Gupta | |
| 2015/0356068 A1 | 1/2015 | Hill | |
| 2015/0138228 A1 | 5/2015 | Chapman | |
| 2015/0215243 A1* | 7/2015 | Xu | G06Q 10/101 |
| | | | 709/206 |
| 2015/0227632 A1 | 8/2015 | Lunardi | |
| 2015/0242086 A1 | 8/2015 | Mindlin | |
| 2015/0347920 A1 | 12/2015 | Medlock | |
| 2015/0365426 A1 | 12/2015 | Henocque | |
| 2015/0378564 A1* | 12/2015 | Ramanathan | G06F 3/04817 |
| | | | 715/738 |
| 2016/0055374 A1 | 2/2016 | Zhang | |
| 2016/0085602 A1 | 3/2016 | Jacobson | |
| 2016/0092572 A1 | 3/2016 | Venkata | |
| 2016/0103801 A1 | 4/2016 | Bartiz | |
| 2016/0117072 A1 | 4/2016 | Sharifi | |
| 2016/0306777 A1 | 10/2016 | George | |
| 2016/0371495 A1 | 12/2016 | Bhat | |
| 2017/0031825 A1 | 2/2017 | Chen | |
| 2017/0031831 A1 | 2/2017 | Bohra | |
| 2017/0039281 A1 | 2/2017 | Venkata | |
| 2017/0041296 A1 | 2/2017 | Ford | |
| 2017/0118303 A1 | 4/2017 | Vigeant | |
| 2017/0118308 A1 | 4/2017 | Vigeant et al. | |
| 2017/0160895 A1 | 6/2017 | Hu | |
| 2017/0237868 A1 | 8/2017 | Sato | |
| 2017/0308271 A1 | 10/2017 | Li | |
| 2017/0351708 A1 | 12/2017 | Lahmann | |
| 2017/0357437 A1 | 12/2017 | Petersen | |
| 2018/0069947 A1 | 3/2018 | Antipa | |
| 2018/0150899 A1 | 5/2018 | Waldron | |
| 2018/0335911 A1 | 11/2018 | Nilo | |
| 2018/0335912 A1 | 11/2018 | Nilo | |
| 2018/0352172 A1 | 12/2018 | Hansbrough | |
| 2018/0357981 A1* | 12/2018 | Ng | G06Q 30/0269 |

OTHER PUBLICATIONS

Google Now, available online at https://en.wikipedia.org/wiki/Google_Now, Oct. 29, 2015, 6 pages, retrieved on Jan. 10, 2017.
Microsoft Power BI (Business intelligence), available online at https://en.wikipedia.org/wiki/Power_BI, 2 pages, updated on Aug. 29, 2016; retrieved on Sep. 22, 2016.
Power BI—basic concepts, Microsoft Power BI, available online at https://powerbi.microsoft.com/enus/documentation/powerbi-service-basic-concepts/, 2015, 11 pages, retrieved on Mar. 10, 2016.
Novet, Birst lets you search enterprise data like you search Google, VentureBeat, available online at http://venturebeat.com/20I 3/12/1 0/birst-boosts-business-intelligence-with-google-like-search-to-visualize-data/, Dec. 10, 2013, 3 pages, retrieved on Mar. 10, 2016.
Power BI Support, Q&A in Power BI, available online at https://powerbi.microsoft.com/en-us/documentation/powerbiservice-q-and-a/, 2015, 4 pages, retrieved on Mar. 10, 2016.
Search-Driven Analytics for Humans—Now anyone can be their own data analyst, Thought Spot, available online at www.thoughtspot.com, 4 pages, retrieved on Mar. 10, 2016.

\* cited by examiner

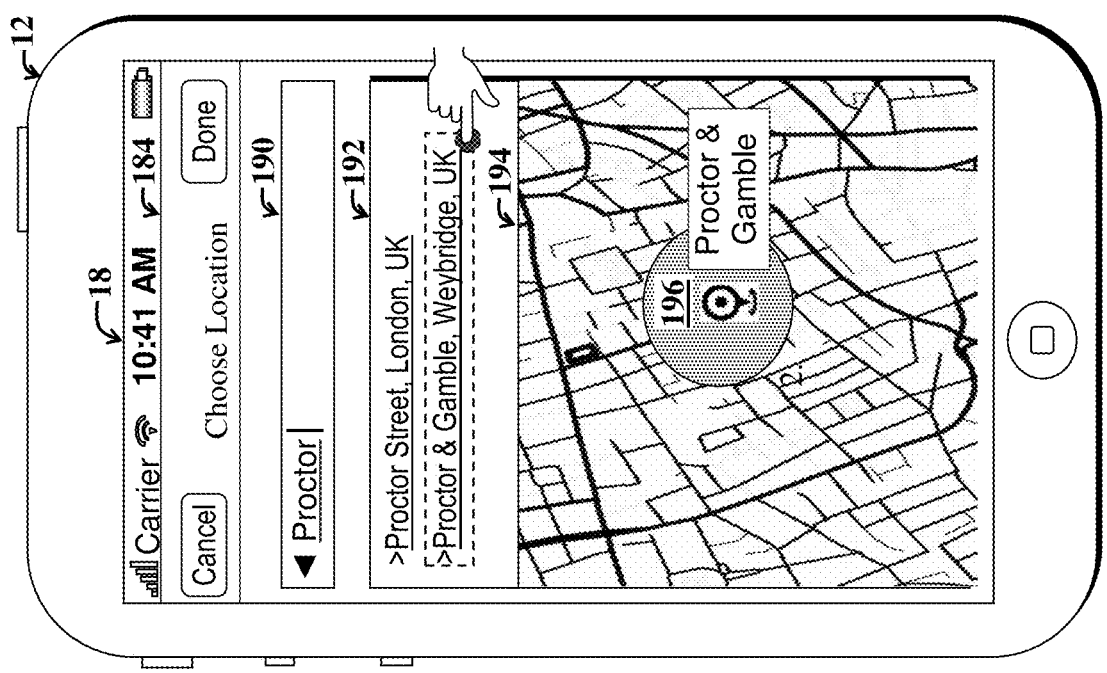

CONTENT DISPLAY AND INTERACTION ACCORDING TO ESTIMATES OF CONTENT USEFULNESS

CROSS REFERENCES TO RELATED APPLICATIONS

This application is a continuation of the following application, U.S. patent application Ser. No. 15/273,567, entitled AUTOMATIC REDISPLAY OF A USER INTERFACE INCLUDING A VISUALIZATION, filed on Sep. 22, 2016 which claims priority from U.S. Provisional Patent Application Ser. No. 62/246,031, entitled DAY-BY-DAY, filed on Oct. 24, 2015, which is hereby incorporated by reference as if set forth in full in this application for all purposes.

This application is related to U.S. patent application Ser. No. 16/662,695 entitled TECHNIQUES FOR SEMANTIC SEARCHING, filed on Oct. 24, 2019, U.S. patent application Ser. No. 14/861,893 entitled SEMANTIC SEARCHES IN A BUSINESS INTELLIGENCE SYSTEM, filed on Sep. 22, 2015, U.S. patent application Ser. No. 15/691,550, entitled INTER-APPLICATION SHARING, filed on Aug. 30, 2017, which claims priority to U.S. Provisional Patent Application Ser. No. 62/246,031, entitled 62/514,682, filed on Jun. 2, 2017, and U.S. patent application Ser. No. 15/693,330, entitled IMPORTING AND PRESENTING DATA, filed on Aug. 31, 2017, which claims priority to U.S. Provisional Patent Application Ser. No. 62/514,693, entitled IMPORTING AND PRESENTING DATA, filed on Jun. 2, 2017 which are hereby incorporated by reference as if set forth in full in this application for all purposes.

BACKGROUND

The present application relates to computing and more specifically to software and accompanying systems, methods, and user interfaces for facilitating selecting, conveying, and interacting with information in networked computing environments.

Software for facilitating conveying information is employed in various demanding applications, including general collaboration software, mobile enterprise applications enabling user access to enterprise data, and so on. Such applications often demand user friendly software and accompanying user interfaces that enable efficient and timely content access, delivery, and sharing, and that provide features for interacting with content, mechanisms for selecting and delivering content, and so on.

Efficient user friendly mechanisms for selecting, delivering, and presenting content can be particularly important in enterprise applications, such as mobile Business Intelligence (BI) enterprise applications, where enterprise personnel often demand timely delivery of relevant information organized in readily understandable formats, and where inefficient information access can inhibit informed decision making and associated business growth. Enterprises are particularly motivated to enhance workforce knowledge, thereby enabling improved business decisions.

Conventionally, a BI enterprise application includes enterprise data analysis tools used by data specialists tasked with accessing data from a database and for building reports, charts, graphs, and so on, based on requests from other enterprise personnel. Generally, data specialists will use the BI tools to connect to a database; extract data; then analyze and/or format that data before delivering resulting static reports to other enterprise personnel.

However, such conventional BI applications and associated approaches are often time consuming and require detailed user knowledge of the database architecture or schema. Enterprise personnel must often wait for requested reports to be prepared and delivered by a data specialist. However, untimely content delivery can further inhibit informed decision making. Accordingly, conventional BI applications and associated systems often exhibit friction or inefficiencies between enterprise users and sought content.

SUMMARY

An example method facilitates selective retrieval of, display of, and user interaction with content sought by the user. The example method includes providing a first User Interface (UI) control for accepting an input query; retrieving content in accordance with the input query, resulting in retrieved content; displaying the retrieved content in one or more UI cards showing plural visualizations based on the retrieved content, including a first visualization and a second visualization, wherein the first visualization is characterized by plural data dimensions, and wherein the second visualization is characterized by a filtered version of the plural data dimensions; and providing a second UI control suitable to enable a user to rate a usefulness of one or more of the first visualization or the second visualization.

In a more specific embodiment, the second UI control provides a user option to dismiss, i.e., not show, the first visualization, such that a first UI card, which includes the first visualization, is removed from a UI display screen in which it was displayed. The example method further includes detecting when the second UI control is used for dismissing the first visualization, and then augmenting context information usable by a software application to facilitate estimating a usefulness of the first UI card based on the dismissing of the first visualization.

The specific example method further includes collecting visualization dismissal information and visualization selection information from plural users of the software application or instances thereof; and using the dismissal information and selection information to affect subsequently displayed retrieved content representing query search results.

A third UI control provides a user option to flip the first UI card so as to real additional information and/or UI controls related to content associated with the first UI card. A fourth UI control provides a user option to annotate the first UI card. A fifth UI control provides a user option to share the first visualization and the second visualization (which represent displayed content) with one or more additional users of the software application (or instances thereof).

The additional users of the software application may represent one or more surrounding or nearby users of the software application, or instances thereof, that are within communication range of the first user, wherein the communication range is determined by a range of Wi-Fi or Bluetooth used by a first communication device of the first user.

The example method may further include selectively filtering content that is shared with the surrounding or nearby users in accordance with one or more data access permissions associated with the one or more surrounding users. A sixth UI control may prove a user option to selectively share a portion (e.g., a link or other portion) of the UI display screen.

Accordingly, various embodiments disclosed herein facilitate providing differing views (via visualizations with showing different dimensions, including selectively filtered dimensions) of content retrieved in response to an input query, or otherwise automatically retrieved when a given condition is met or when content is shared. Additional functionality enables users to effectively rate the usefulness of retrieved visualizations, such as by tracking dismissals of visualizations. Such preference ratings can also account for prior chart/visualization selections.

For example, in certain implementations, user selection of a "don't show" UI control automatically triggers both removal of the associated UI card from the accompanying UI display screen, and further augments context information usable by the underlying system to estimate a usefulness of the UI card 130. When the card is dismissed, the dismissal information can then affect subsequent query search results.

Accordingly, user insight into retrieved data is greatly facilitated by embodiments discussed herein that facilitate generation and display of plural visualizations (e.g., analytics) responsive to input queries or other conditions; wherein the visualizations are, over time, more preferred visualizations; and wherein the visualizations include selectively filtered data that provide additional views of the data. By facilitating multiple perspectives of the underlying data, users may more readily understand the data from different visual perspectives, thereby potentially providing additional user insights and a deeper understanding of enterprise content retrieved in response to the search.

Various embodiments may also employ interactive visualizations (e.g., where the visualizations may be altered, drilled down, shared, dismissed, or otherwise rated, etc.), pertaining to subject matter estimated to be of relevance or usefulness to the user.

Hence, certain embodiments discussed herein effectively address a need for user friendly BI analytics usable by a mobile enterprise workforce, which removes friction (e.g., enhances efficiencies) between enterprise users and sought information, without requiring detailed technical expertise, thereby facilitating informed decision making.

A further understanding of the nature and the advantages of particular embodiments disclosed herein may be realized by reference of the remaining portions of the specification and the attached drawings.

BRIEF DESCRIPTION OF THE DRAWINGS

FIG. 11 illustrates a seventh example UI display screen showing various user options for interacting with content of a selected UI card, including drilling, annotating, sharing a live chart or screen shot thereof, and so on.

FIG. 12 illustrates a eighth example UI display screen showing additional user options for interacting with a UI card, including an option to selectively bring back or redisplay the card, add the card to a home screen or activity feed, an option to flip the card, and an option to not show the UI card.

FIG. 13 illustrates a ninth example UI display screen showing a pop up window displayed responsive to user selection of the bring back option from the eighth UI display screen of FIG. 12, wherein the pop up window includes user options (e.g., UI controls) for facilitating user specification of bring back conditions, e.g., time, place, when contacted by, and so on.

FIG. 14 illustrates a tenth example UI display screen showing additional user options for specifying a bring back condition pertaining to a particular device location or region.

DETAILED DESCRIPTION OF EMBODIMENTS

Figure 1:
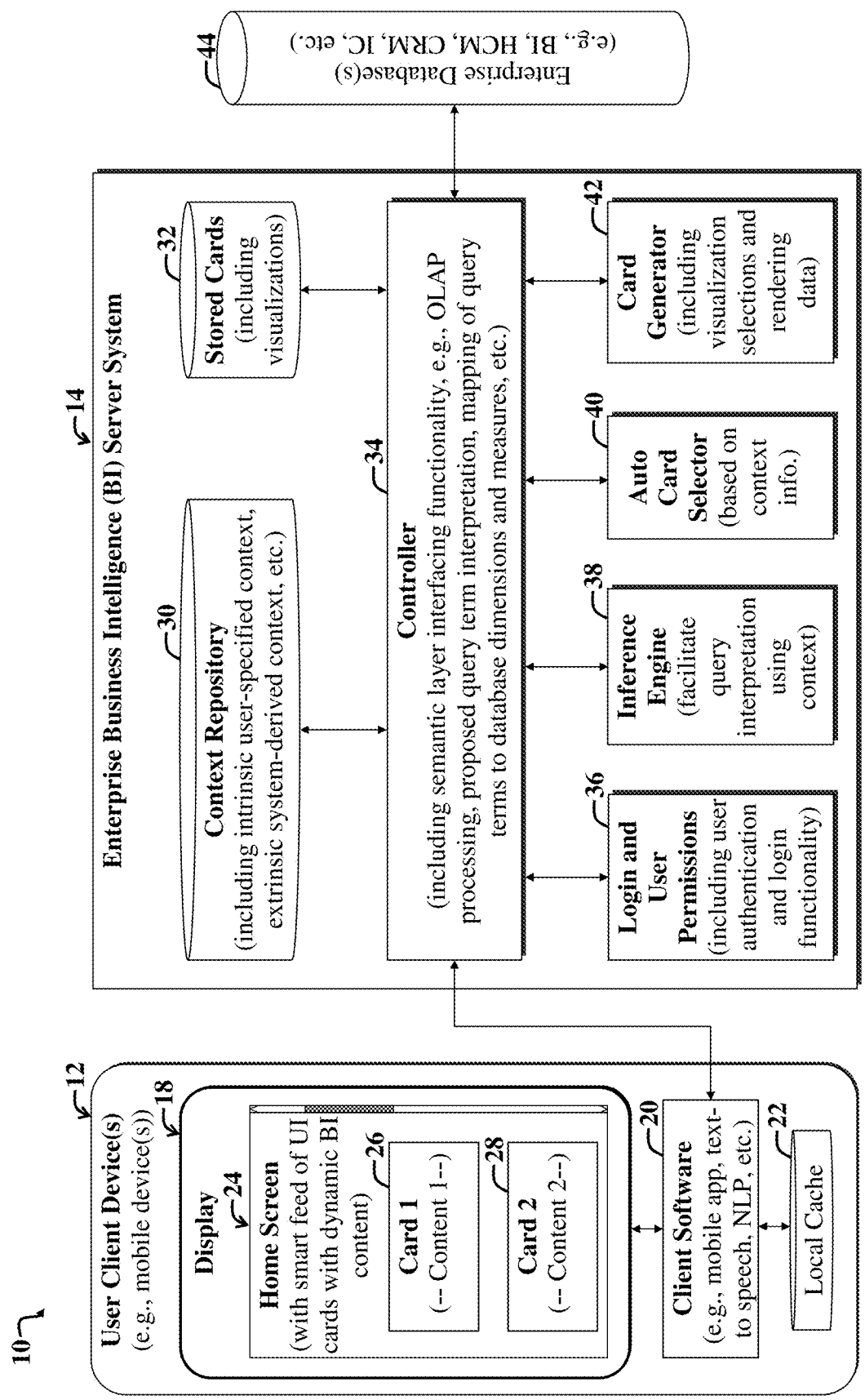
FIG. 1 illustrates a first example system and accompanying computing environment configured to enable selective context-based enterprise BI content delivery to one or more mobile computing devices, leveraging both intrinsic context information and extrinsic context information.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as User Interface (UI) software modules or components.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Such tasks may represent or be implemented via one or more software actions. A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on. The terms "software action" and "action" are employed interchangeably herein.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application. An example of a computing domain is a WebLogic Server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, routers, the Internet, administration servers, server cluster controllers, process schedulers, virtual machines, database management systems, mobile device managers, synchronization engines, Application Programming Interfaces (APIs), web services, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment configured to enable selective context-based enterprise BI content delivery to one or more mobile computing devices 12, leveraging both intrinsic context (e.g., representing user-specified selections, conditions, etc.) and extrinsic context (e.g., overall system usage history, physical device location, user team membership, user data access permissions, etc.).

For the purposes of the present discussion, context information may be any metadata (e.g., data about or otherwise associated with other data or computing objects or entities) that may be associated with a user, user interaction with a computing device, a computing device (including software used by the computing device), and so on. The terms "context information" and "context" may be employed interchangeably herein.

A mobile device, also called a mobile computing device, may be any computer that is adapted for portable use. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on.

Intrinsic context information may be any context information that is specifically chosen or specified by the user, e.g., via user input. Examples of intrinsic context information characterizing information sought by a user include natural language query statements and expressions, user-specified bring back conditions, and so on. A bring back condition may be any user-specified data that when true, may be used to redisplay or retrieve content associated with the condition when the condition is met, as determined by the system with reference to extrinsic context information. Examples of bring back conditions are discussed more fully below.

Extrinsic context information may be any context information that is not explicitly chosen or specified by a user so as to affect software operation. Examples of extrinsic context information include, user data access permissions (e.g., associated with user login credentials), user computing device location (e.g., as indicated via a Global Positioning System (GPS) receiver), user teams or collaboration groups, business tasks assigned to a user, projects that a user is working on, data characterizing a history of user interaction with the system 10, time of day, day of week, date, contact lists, information about who has recently contacted a user and where and how they were contacted, and so on. Extrinsic context information may also include aggregated metrics calculated from analysis of activities of plural users of the system 10 (e.g., all authorized users interacting with the system 10), and so on.

The example system 10 may leverage both intrinsic and extrinsic context to facilitate efficient timely delivery of relevant BI content (e.g., analytics) to users, as discussed more fully below.

Business context information may include any context information that is related to a business entity, e.g., a resource, software application, employee, enterprise task, opportunity, contact, and so on. The terms "business context information" and "business context" are employed interchangeably herein.

As it pertains to Natural Language Processing (NLP), e.g., mechanisms for generating machine interpretations of natural language expressions, context information may include any information that may be employed to inform natural language processing to estimate user intent or meaning of natural language or portions thereof. User intent of a portion of natural language is said to be estimated if a meaning is associated with or attributed to the portion of natural language. Accordingly, context information may include any information pertaining to natural language input, including, but not limited to user data, such as user location information, calendar entries, appointments, business cycle information, contacts, employee performance metrics, user data access permissions or authentication level, and so on.

As it pertains to software visualizations (e.g., analytics and associated charts, graphs, diagrams, etc.), context information may include any information that is auxiliary to source data used to display a visualization. Source data may be any data used to build a structure of a visualization. For example, a corporate organizational chart may use employee names, employee enterprise roles, and hierarchal rules applicable to enterprise roles as source data to construct the organizational chart. In this example, context information may include, for example, information indicating that a user is seeking information as to whether a particular decision made by a particular employee was approved by the appropriate persons, or that the user is on a project pertaining to corporate compensation levels and may wish to ensure that higher level employees are not compensated less than lower level employees, and so on.

In the present example embodiment, the underlying system 10 may collect context information via various mechanisms, such as via one or more user responses to a query; user answers to a questionnaire; monitoring of user software usage history; location information, and so on.

Context information is said to be associated with a user if the context information is associated with a device or software accessible to the user. For example, a mobile phone user may be employing a mobile device with a GPS receiver. The mobile device is said to be associated with the user, as is GPS location information provided by the GPS receiver thereof. Similarly, a user employing calendar software may enter appointments. Appoint information stored via the calendar software is associated with the user.

Accordingly, context information associated with a user (also called individual user context information) may include any context information pertaining directly to the user or pertaining to one or more tasks, opportunities, or other computing objects (e.g., business objects) that are associated with or otherwise employed by the user or used by software employed by the user).

Note that in certain embodiments discussed herein, user context information may be derived, in part, with reference to a permissions database that stores user enterprise access permissions, e.g., software and data access and use privileges. Note that user data may be any context information characterizing or otherwise associated with a user of software and/or hardware. For example, user data may include enterprise software permissions (i.e., privileges), job qualifications, such as work experience, education and related degrees, awards, and so on. User data may further include, for example, user job preferences, such as location, employer, vacation time allowed, hours worked per week, compensation (e.g., salary), and so on.

User privileges information may be any permissions or specification of permissions associated with a user, wherein the permissions specify whether or not and/or how a user may access or use data, software functionality, or other enterprise resources. Accordingly, user privileges information, also simply called user permissions or user privileges, may define what a user is permitted or not permitted to do in association with access to or use of enterprise resources, such as computing resources.

User job role information may include any data characterizing a position or description of a position held by the user at an enterprise. Accordingly, job role information may be a type of context information associated with the user, wherein the context information may also include user privileges information associated with the job role, i.e., position. For example, if a user is a system administrator employee, the user may have special permissions to change system configuration parameters and may then have access to various types of visualizations characterizing system architecture, operations, and so on.

In the example system 10, the one or more mobile computing devices (e.g., smartphone, tablet, laptop, etc.) 12 communicate with an enterprise BI server system 14 via a network, such as the Internet. The BI server system 14 communicates with backend enterprise databases 44 (which may include warehouses or collections of databases), e.g., BI, HCM, CRM databases, and so on.

Note that various modules of the system 10 may be grouped, arranged, coupled, and/or distributed differently than shown, without departing from the scope of the present teachings. For example, in an alternative grouping, the enterprise databases 44 may be considered as part of the BI server system 14. Similarly, some software functionality provided by the server system 14 and enterprise databases 44 may be offloaded to the client device 12, e.g., enterprise content may be cached locally on the client device 12 and used in an offline mode, as discussed more fully below. Similarly, in certain implementations, interconnections between modules may be different than those shown.

The example client device 12 includes a display 18 for presenting UI display screens, such as a home screen 24, also called an activity screen, dashboard, smart feed of BI content, or simply feed.

For the purposes of the present discussion, a user interface display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or card (where a card may represent a sub-UI display screen within a larger UI display screen). Views or windows may include sections, such as sub-views or sub-windows, dialog boxes, graphs, tables, UI cards, and so on. In certain cases, a UI display screen may refer to all application windows presently displayed on a display.

For the purposes of the present discussion, a UI card may be UI display screen section. In various embodiments discussed herein, UI cards may contain specific categories of content and associated enterprise data and/or analytics, as discussed more fully below.

The example home screen or smart feed 24 of the client device 12 includes a scrollable listing of UI cards, including a first example card 26 and a second example card 28. Examples of UI card types include analytic cards, detailed information cards, email cards, calendar cards, report cards, trending-data cards (also called "what's trending" cards), shared cards, activity summary cards, custom cards, and so on.

In general, content included in example analytic cards discussed herein may include analytics, e.g., interactive visualizations. For the purposes of the present discussion, an analytic may be any calculation or measurement based on a given input. Certain analytics may be displayed graphically. For example, an analytic that calculates a degree of a match between a user and a candidate position based on information about the user and various candidate positions may be displayed via a bar chart. In general, a graphically displayed analytic or other visual representation of data is called a visualization herein.

An interactive visualization may be any visualization that includes or is displayed in association with one or more UI controls enabling user interactions with the visualization and/or underlying data of the visualization. A user interaction may include any user input resulting in an adjustment to an appearance, behavior, type, or other property of a visualization.

Examples of interactions that may be supported by analytic cards discussed herein include drill-down (e.g., selection of a portion or node of a visualization to trigger display of additional details associated with data underlying the portion or node of the visualization), change chart type, pivot (e.g., changing chart axis), filter data, show/hide a group, data hierarchy, dimension, and so on. Note that user interactions and associated UI controls discussed herein with respect to analytic cards are not limited. For example, certain cards may be flipped or rotated to yield additional information; certain cards may support user edits to underlying data of a visualization, and so on.

For the purposes of the present discussion, underlying data may be any data used to generate a visualization, where nodes or components of the visualization may represent one or more objects, database dimensions, features, or other data characteristics. Hence, underlying data may include information and/or functionality represented by or corresponding to a node or visualization component, including link information. For example, a node representing a person in an enterprise organizational chart may be associated with additional underlying data that includes, for example, employee job title, phone number, address, and so on.

In various embodiments discussed herein, underlying data of a visualization may include structured data. Structured data may be any data organized or otherwise accessible in accordance with a data model, e.g., as may be provided via a relational database.

For the purposes of the present discussion, data dimension may be any category or classification of an amount or category. For example, columns of a table may represent data dimensions. The terms "data dimension" and "database dimension" may be employed interchangeably herein.

In the present example embodiment, the UI cards 26, 28 represent a home screen list of analytic cards that may be automatically selected by the system 10 (as discussed more fully below) to populate the home screen 24 based on context information. The context information may include information about what the user has been doing, i.e., user activity, e.g., who recently emailed, texted, or called the user, where the user was when contacted (i.e., where the computing device 12 associated with the user was), where the user (i.e., user device 12) currently is located (as indicated by the GPS location of the mobile device 12), the current time of day, date, what projects and/or business tasks the user is working on, what teams or enterprise groups the user is associated with, which content the user has been interacting with, user software navigation history, user interaction logs (e.g., tracking usage of the system 10), and so on.

Cards that change or update throughout the day, e.g., in approximately real time, to reflect changing context; changing underlying data, etc., are called dynamic cards or dynamically updating cards herein. Note that in certain embodiments discussed herein, automatic selection of cards 26, 28 is not limited to selections based on individual user context, but may leverage aggregated context information derived or collected from plural users of the system 10, including all users of the system 10 or subsets thereof. Examples of subsets of users for which context may be aggregated and used include particular enterprise teams include contacts related by social network connections, persons sharing cards with nearby users, and so on.

The UI cards 26, 28 are rendered in part using client software 20. In the present example embodiment, the client software 20 (also called a mobile application) includes Graphical User Interface (GUI) software in communication with speech-to-text software, Natural Language Processing (NLP) software, network communications modules (e.g., mobile synchronization functionality to synchronize communications with the BI server system 14 over a network), and so on. Those skilled in the art with access to the present teachings may readily determine, implement, and incorporate appropriate software modules and associated software functionality to meet the needs of a given implementation, without undue experimentation.

Note that in alternative implementations, certain functions of the client software 20 may instead be located on the BI server system 14 and/or on other servers in communication with the BI server system 14. For example, in certain implementations, the client software 20 may be implemented via a mobile browser used to access a website hosted by a web server, which in turn uses web services and/or APIs to interface with one or more application servers of the BI server system 14 to facilitate updating the UI cards 26, 28.

In the present example embodiment, the client software 20 is implemented via a mobile application configured to communicate with and synchronize with a controller module 34 of the BI server system 14 to selectively retrieve data (including analytics) needed to implement the UI display screen 24 and accompanying UI cards 26, 28. Data retrieved to the client device 12 during a particular session may be locally cached in a local client-side cache 22. Accordingly, a user of the client device 12 will be able to operate the client software 20 and view and interact with cards 26, 28 that leverage data and/or instructions that are cached in the local cache 22.

The example BI server system 14 leverages functionality provided by various modules 30-42. The controller 34 includes software functionality that facilitates interfacing and using data and functionality from various modules, including a user login and permission module 36, an inference engine 38, an automatic card selection module 40 (also called auto card selector), a card generator module 42, a context information repository 30 (also simply called a context repository), stored cards 32 (i.e., stored card content for each user), and one or more enterprise databases 44.

Note that some of the software functionality provided by the modules 30-42 may alternatively and/or additionally be implemented via the client software 20. For example, in certain implementations, the inference engine 38 may be implemented client-side on the client device 12.

The example controller 34 includes semantic layer interfacing functionality, including OnLine Analytical Processing (OLAP), additional query term or expression (i.e., natural language input) interpretation (e.g., based on aggregated user context information) functionality, functionality for the mapping of query terms to database dimensions and measures, and so on.

For the purposes of the present discussion, natural language input may be any instruction or information provided via spoken or written (e.g., typed) human language. Examples of language input usable with certain embodiments discussed herein include voice queries and/or commands (which are then converted into text), text messages (e.g., Short Message Service (SMS) text messages), emails containing text, direct text entry, and so on. Natural language input provided to trigger a search for enterprise content is called a natural language query herein.

The login and user permissions module 36 includes computer code for facilitating user login to the system 14. When initially accessing the BI server system 14 using the client device 12, the user may enter login information (e.g., username and password, biometric information, etc.) or may otherwise submit a biometric sample (e.g., fingerprint scan) to facilitate confirming user identity and application of appropriate restrictions, e.g., data access permissions, to the user client device session with the BI server system.

Note that user identity and associated data access permissions may represent a type of context information usable by the system 10 to selectively adjust content provided via the cards 26, 28. In general, for the purposes of the present discussion, an identity of a user may be any information identifying a user. For example, a user's identity may include login information, email address, phone number, name, biometric sample, and so on. Certain embodiments discussed herein may employ any such identifying information to facilitate, for example, determining a mostly likely command or query term intended by particular language input or software interaction. The identifying information may be further used to associate the user of the client device 12 with user-specific data maintained via the BI server system 14, e.g., user context information stored in the context repository 30, stored cards 32, and so on.

The inference engine 38 includes computer code for facilitating query term or expression interpretation, e.g., using context information maintained via the context repository 30. The inference engine 38 may be used to infer, for example, that the term "profitability" actually refers to a "profit margin" dimension of an OLAP hypercube harvested from the enterprise databases 44 via the controller 34 and associated interfaces, as discussed more fully below with reference to FIGS. 15 and 16.

The auto card selector module 40 (which may alternatively and/or additionally be implemented client side, i.e., on the client device 12) facilitates accessing OLAP hyper cubes; mapping of natural language input expressions into Multi-Dimensional eXpressions (MDX); and selection of card types in accordance with the mappings of the input expressions into database dimensions, measures, analytic calculations, and so on.

The card generator 42 includes computer code for facilitating organizing data for use in visualizations, selections of visualizations in accordance with card type determined by the auto card selector 40, collecting rendering data used to render the card, and so on. Note that certain functions of the card generator 42 may also be implemented client-side, e.g., generation of card rendering instructions.

Various functional modules 36-42 of the BI server system 14 may access data from the context repository 30 and from the stored cards repository 32 via interfacing functionality included in the controller 34. The example context repository includes intrinsic user-specified context information, extrinsic system-derived context information, and so on.

Note that the context information maintained by the context repository 30 may include dynamic context information, e.g., context information subject to periodic or daily change, including context information subject to approximately real time change. An example of dynamic context information subject to approximately real time change includes GPS location information characterizing the client device 12. Additional dynamic context information may include context information indicating who the user is communicating with (and/or has been communicating with), where the user is located, what interactions the user is performing using the system 10, when the user is performing the interactions (e.g., communicating, sharing content, following content of other users, and so on), and so on.

Note that the present example embodiment may facilitate dynamic context-based push of BI content to the home screen 24, such that the home screen 24 is updated periodically or in approximately real time with BI content that is calculated or otherwise determined based in part on dynamic context information.

The dynamic context information may include dynamic extrinsic context information, such as context information that changes based on user interaction with a mobile computing device, e.g., the client device 12. The user interaction with the mobile computing device 12 may include moving the device to different locations or regions; automatically updating employee key performance indicators, and so on.

Similarly, non-dynamic context information may include any context information that is not based solely on user interaction with the system 10 via the client device 12, e.g., user data access permissions, user name, job role, and so on.

Note that various implementations of the BI server system 14 are possible and are not limited to that shown in FIG. 1. Additional details of an example server system that may be leveraged to implement various embodiments discussed here are discussed in the above-identified and incorporated U.S. patent application, entitled "SEMANTIC SEARCHES IN A BUSINESS INTELLIGENCE SYSTEM," which is fully incorporated by reference herein.

Figure 2:
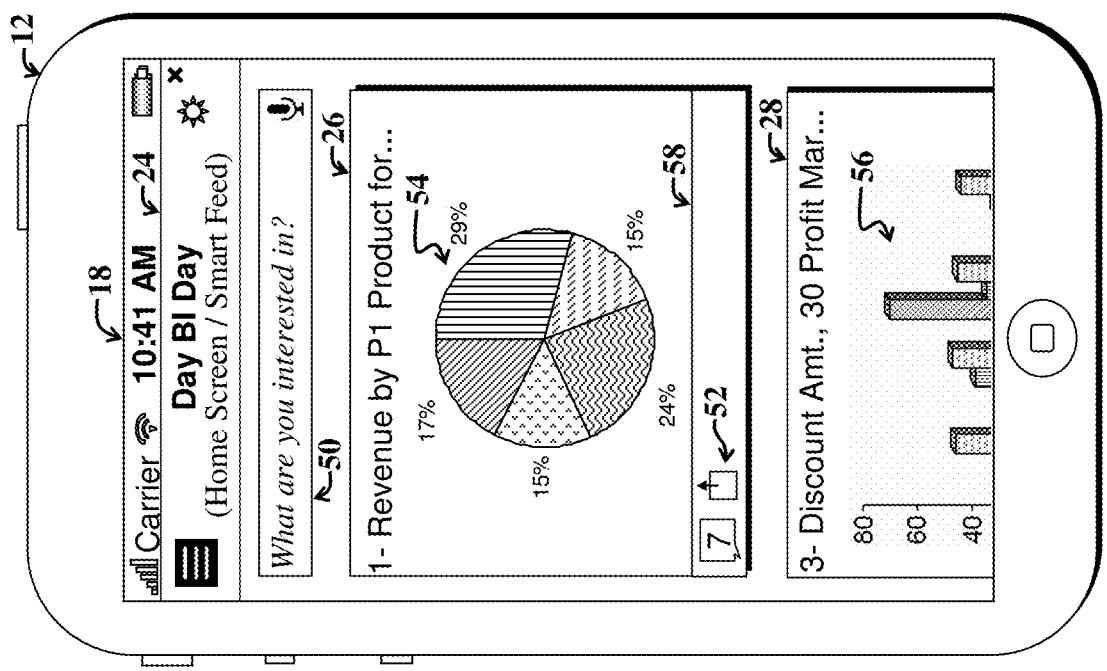
FIG. 2 illustrates a first example User Interface (UI display screen) suitable for use with the example system of FIG. 1 and representing a home screen (also called dashboard) with dynamically updatable (in accordance with changing context information) UI display screen sections and content, representing a sharable BI content smart feed.

FIG. 2 illustrates a first example UI display screen 24 (shown on a touch display 18 of the client device 12, e.g., mobile computing device, also simply called mobile device) suitable for use with the example system 10 of FIG. 1 and representing a home screen (also called dashboard) with dynamically updatable (in accordance with changing context information) UI display screen sections 26, 28 and content, representing a sharable BI content smart feed (also called activity feed or dashboard feed).

The example activity feed of UI cards 26, 28 includes a first UI card 26, and a second UI card 28. Note that the activity feed 26, 28 may include several additional UI cards that are not shown in the home screen 24 of FIG. 2, but which may be revealed in response to scrolling, e.g., via an upward swipe gesture on the touch display 18.

The home screen includes a query entry field 50, which may represent a UI control for enabling a user to enter natural language input, e.g., electronic text-based queries. For the purposes of the present discussion, electronic text may be any electronic representation of one or more letters, numbers or other characters, and may include electronic representations of natural language, such as words, sentences, and so on. The terms "electronic text" and "text" are employed interchangeably herein.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

Electronic text entered into the text field 50 may be entered via voice, i.e., by speaking into a microphone of the mobile device 12; by typing text into the field 50; or via other mechanisms (e.g., handwriting using a stylus and handwriting recognition software functionality). When voice is used to enter electronic text into the query entry field 50, underlying speech-to-text functionality (which may include software, e.g., APIs running on the mobile device and/or on a server accessible to the mobile device 12) converts spoken words and phrases into text, which is then automatically entered into the field.

In response to entry of natural language input into the text field 50, underlying software parses and analyzes each expression of the natural language input and may determine candidate matches for each expression. When the text is entered using voice, the entire natural language input may be treated as a single expression, such that the underlying software estimates user intent behind the entire string of natural language input.

For the purposes of the present discussion, user intent of a portion of natural language, such as an entered query, is said to be estimated if a meaning is associated with or attributed to the portion of natural language. Accordingly, context information may include any information pertaining to natural language input, including, but not limited to user data, such as user location information, calendar entries, appointments, business cycle information, and so on.

Figure 8:
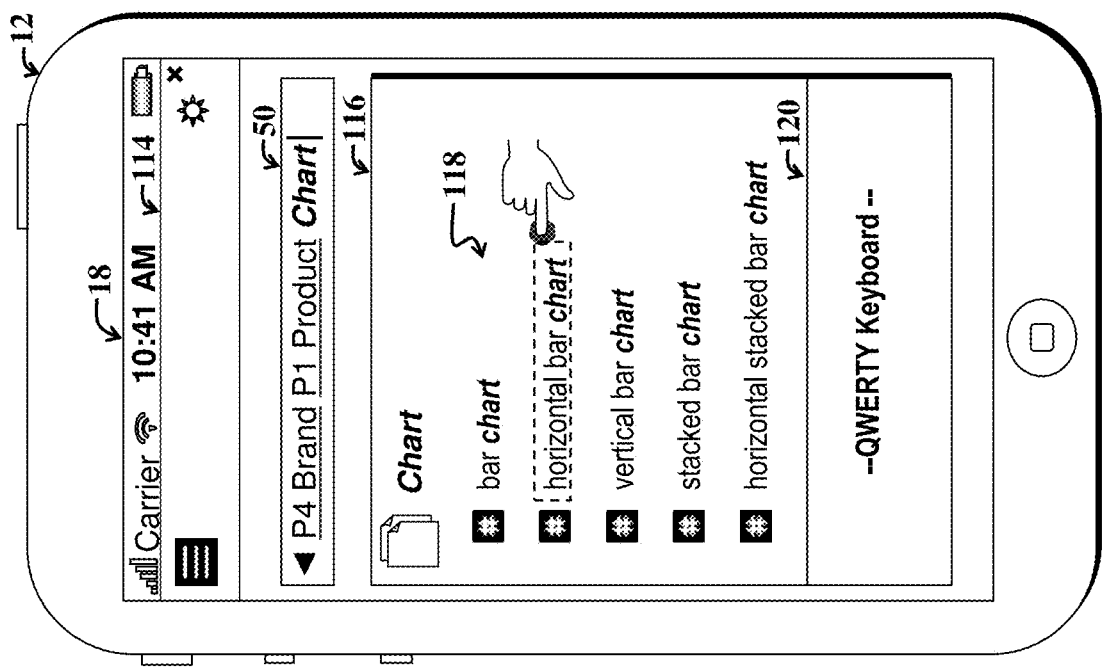
FIG. 8 illustrates a fifth example UI display screen showing example query entry functionality, enabling users to select among plural meanings for entered natural language terms, and in this case, to select among different types of charts or visualizations after entering the term "chart."

When text is entered via typing, as each term or expression of the natural language input is entered, a search may be conducted, resulting in a listing of user selectable candidate interpretations for each entered expression (e.g., as exemplified in FIGS. 8 and 14). The underlying system (e.g., the system 10 of FIG. 1) may remember user selections of proposed terms in association with typed expressions, and then store associated information pertaining to the user selections as metadata (i.e., context information) for subsequent use in refining the list of terms displayed when the term is subsequently typed. Such user context information based on user selections may also facilitate machine interpretation of entire sentences entered via voice input, as discussed more fully below with reference to FIGS. 15 and 16.

In response to entry of a natural language query, the UI display screen 24 may change to reflect content identified by the query. The changed UI display screen 24 may include different UI cards that are not necessarily initially included in the home screen 24. However, during the course of a given day or other time interval (which may be implementation specific), UI cards generated in response to queries (and/or other interactions with the underlying software) may appear in the smart feed of the home screen 24. Cards appearing in the home screen 24 and constituent feed may be selectively dismissed (e.g., by using a "Don't show" UI control) by a user, and removed from the home screen 24, as discussed more fully below (e.g., with reference to FIG. 12).

In the present example embodiment, a user has been interacting with enterprise content pertaining to revenue, discount amount, etc., as reflected by the appearance of the UI cards 26, 28.

The first example UI card 26 represents an analytic card that includes an interactive visualization (which is a pie chart in the present example) illustrating a revenue breakdown in accordance with a previously entered query, and/or based on other context information that may indicate that the enterprise content represented by the first UI card 26 may be of interest to the user. User interaction with the first visualization 54 may be facilitated via UI controls (e.g., controls 52 included in a UI card footer section 58), which may provide various user options to manipulate the UI card 26 and associated content (represented by the first visualization 54).

For the purposes of the present discussion, information visualization may be any process involving graphically representing data according to a method or scheme. A graphical representation or rendering of data resulting from an information visualization technique is called a visualization. Example visualizations include pie charts, treemaps, bar charts, line graphs, and so on.

Note that, in general, a visualization may be coupled to, or be considered to include, one or more user interface controls, which are associated with software functionality, whereby user selection of the user interface control triggers execution of a software action.

Note that some UI controls (also called options herein) to interact with the first visualization 54 may be integrated directly into the visualization 54. For example, a tap-and-hold gesture on one of the sections of the pie chart 54 may trigger display of a hover layer with additional details pertaining to the selected section. The hover layer may also include one or more UI controls (e.g., buttons, menus, etc.) to perform additional software actions (e.g., pivoting, data filtering, further drilling down to show even more detailed information pertaining to the selection, and so on).

Examples of possible user interactions with the first visualization 54 include clearing or changing visualization title, axis labels, etc.; converting the visualization into a thumbnail; rating the usefulness of the visualization (e.g., thereby providing additional context information usable by the underlying system); sharing the UI card 26 and content with other users (e.g., nearby users, users of a particular enterprise team, users in a similar social network hierarchy or grouping, people in a contact list of the user, etc.); expanding or maximizing the card 26 so that it occupies a larger are of the UI display screen 24; specifying conditions for bring back or redisplaying the visualization at a different time, place, other context setting, and so on (as discussed more fully below); dismissing and/or otherwise removing the UI card 26 from the home screen 24; accessing more information (e.g.,) about the UI card 26 (e.g., by virtually flipping or rotating the UI card 26 to reveal information that appears to be behind or on the back of the UI card 26); and so on.

Examples of additional information and/or UI controls that may be available after flipping a card include UI controls for providing additional control over subsequent card behaviors and displayed controls, features, and content. Example details that may be revealed in response to a flipping of a UI card include data indicating when the card was last updated, who the card has been shared with, the number of user views associated with the card, who viewed the card (i.e., context information associated with the card). A flipped card may provide additional user options or UI controls for setting additional priorities and properties for visualization types to display when certain contextual conditions are met, and so on.

Similarly, the second UI card 28 includes an interactive visualization 56 pertaining to potentially relevant subject matter, e.g., enterprise content estimated by the underlying system to be of potential interest to the user.

In summary, FIG. 2 shows a particular embodiment where a user is running the smart feed on a mobile computing device, e.g., smartphone. In other embodiments, other computing devices can be used such as a tablet, laptop, desktop, smart watch, etc.

Figure 3:
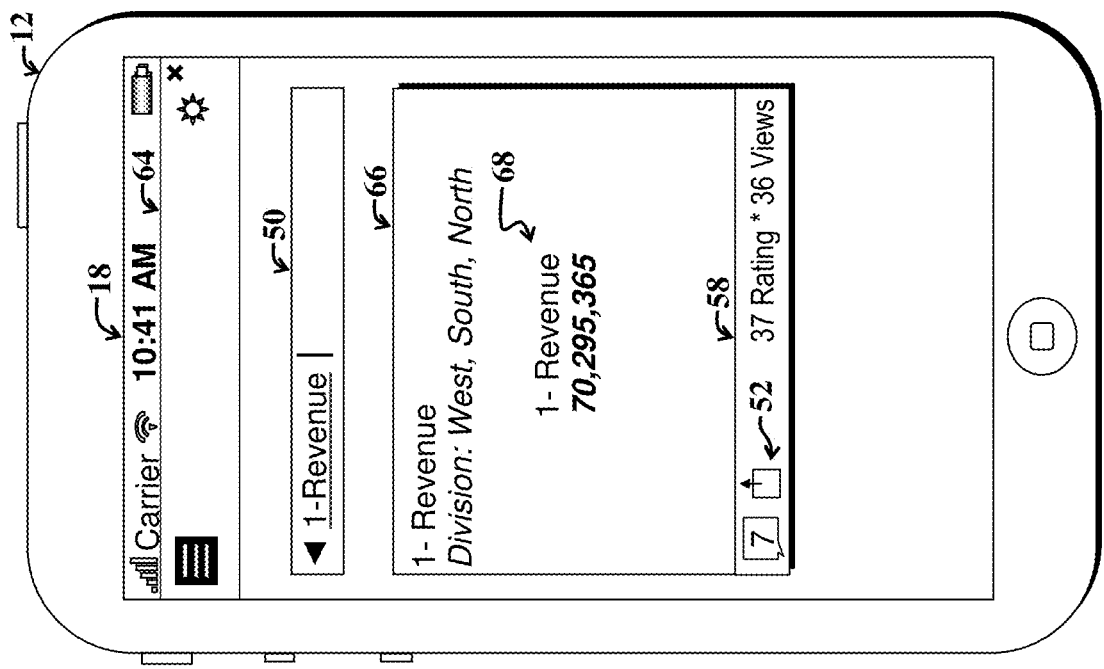
FIG. 3 illustrates a second example UI display screen, where a user has typed a simple natural language query and has selected to display revenue, resulting in display of a UI display screen section (also called card) with content determined based on the query and any applicable extrinsic context information.

FIG. 3 illustrates a second example UI display screen 64, where a user has typed a simple natural language query specifying "Revenue" into the query field 50, thereby selecting to display revenue. Information about revenue (pertaining to a particular entity) that is estimated or judged by the underlying system (by referencing context information) to be of interest to the user is shown in a subsequently displayed UI display screen section 66 (i.e., UI card).

Note that the displayed UI card 66 need not show a visualization, but can instead simply indicate a revenue amount in text form. Content 68 of the revenue UI card 66 is determined by the underlying system based on the query (representing a type of intrinsic context information) and any applicable extrinsic context information.

In summary, FIG. 3 shows that the user has entered the word "Revenue," and the system then displays information on, for example, total revenue. The revenue is associated with a context such as a particular company, division, market, etc., that the user had specified or was working with before.

Figure 4:
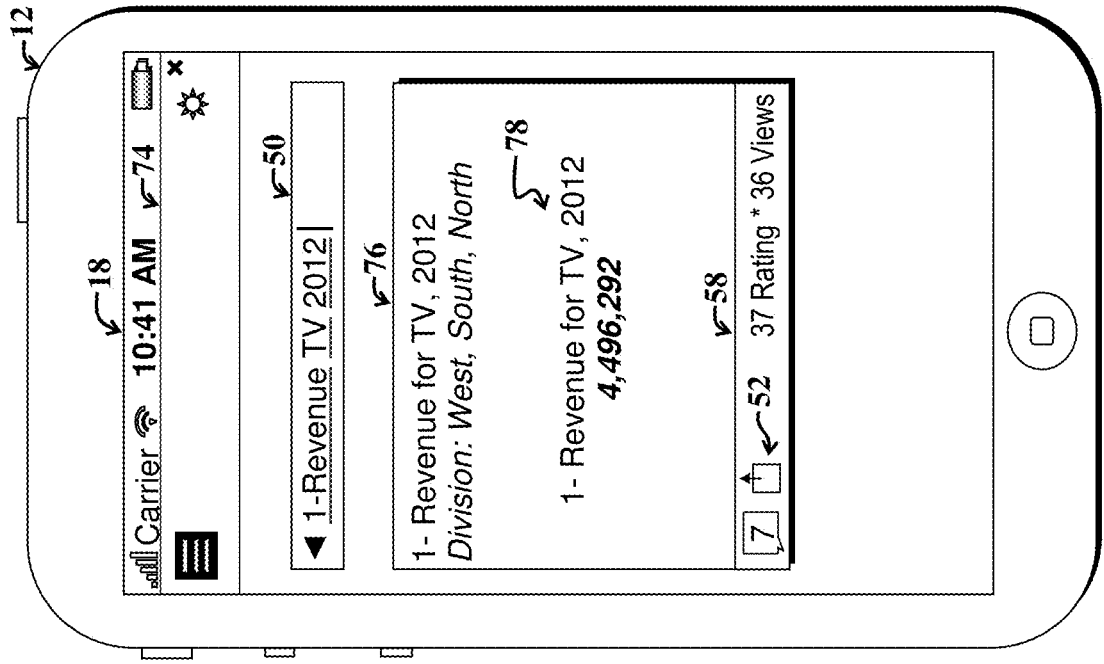
FIG. 4 illustrates a third example UI display screen after a user has added additional limitations (natural language input search terms) to the query of FIG. 3, resulting in further filtered or adjusted results, as presented in an updated UI card.

FIG. 4 illustrates a third example UI display screen 74 after a user has added additional limitations (natural language input search terms) to the query entered in the query field 50 of FIG. 3, resulting in further filtered or adjusted results, as presented in an updated UI card 76.

The additional terms include "TV" and "2012." Accordingly, updated content 78 of the updated UI card 76 includes revenue information for TV sales for the year 2012 for a particular business entity estimated by the system to be of importance to or otherwise associated with the user.

In summary, FIG. 4 shows the effect of the user adding the words "TV" and "2012" to the query text field 50 (also called text box). As the user types added words, the associated filtered data (that is further filtered based on the additional terms) is used to update the UI display screen 74 so that in FIG. 4, the data being shown is revenue for television (i.e., TV) sales in 2012.

Figure 5:
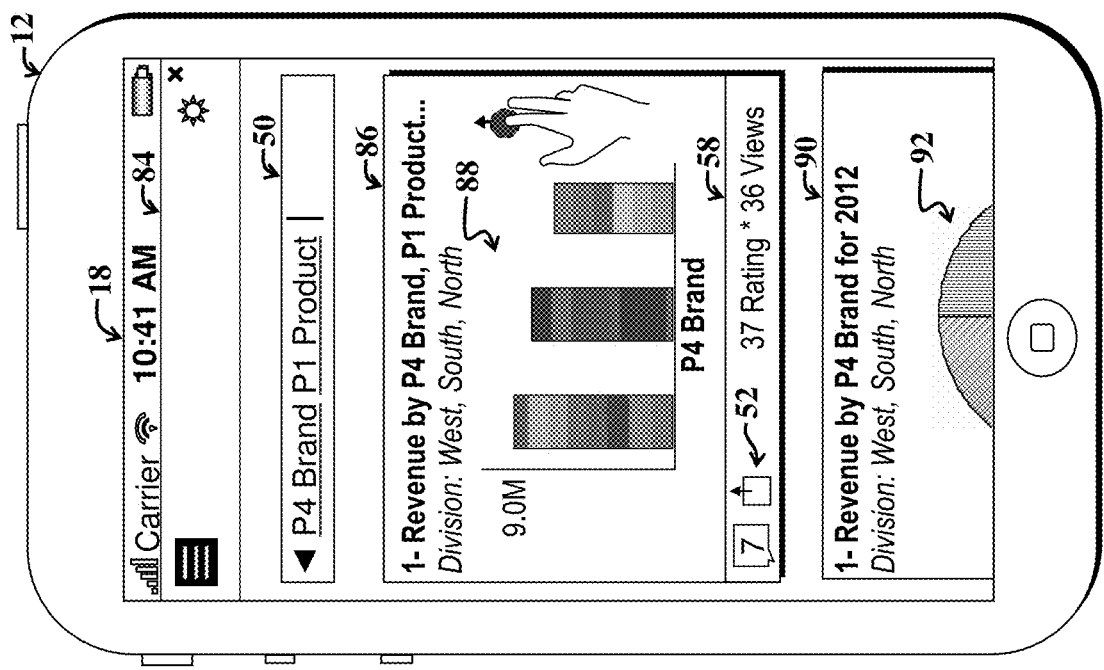
FIG. 5 illustrates a fourth example UI display screen showing a first portion of plural UI cards, wherein the plural UI cards include updated enterprise content responsive to further updates to the natural language query of FIG. 4.

FIG. 5 illustrates a fourth example UI display screen 84 showing a first portion of plural UI cards 86, 90, wherein the plural UI cards 86, 90 include updated enterprise content 88, 92 responsive to further updates to the natural language query entered in the text field 50 of FIG. 4.

The text field 50 in FIG. 5 includes additional terms (i.e., "P4 Brand" and "P1 Product") added to the natural language input, such that the natural language input represents a query expression stating "Revenue TV 2012 P4 Brand P1 Product." The additional terms represent additional intrinsic context that filters and/or adds data dimensions to data underlying enterprise content that underlies cards 86, 90 displayed in the fourth example UI display screen 84.

The adjusted underlying data facilitates automatic generation of visualizations 88, 92, in response to the query adjustment, including a vertical stacked bar chart 88 that incorporates all data dimensions, including 2012 revenue, P4 Brand, and P1 product in the underlying data.

The second automatically generated card 90 that is generated in response to the query entered in the text field 50 includes a pie chart 92 based on the underlying data of the stacked vertical bar chart 88 of the first card 86, but filtered to remove one data dimension, e.g., P1 Product, from the underlying data used to generated the stacked bar chart 88.

In the present example embodiment, three UI cards were automatically generated in response to the query input in the text field 50. While only two UI cards 86, 90 are shown in FIG. 5, additional cards can be revealed, e.g., in response to a vertical scroll of the updated UI display screen 84.

The first card 86 includes enterprise content with all database dimensions of the query, whereas subsequent cards, e.g., the second card 90 leverages similar underlying data, but which has been selectively filtered to provide additional user insight and views of the underlying data.

The exact choice of which cards to show in response to the query and which filters and visualizations to show in the cards 86, 90 are determined by the underlying system (e.g., system 10 of FIG. 1) based on context information, e.g., user software interaction history, e.g., navigation history, content selection history, visualization selection history, and so on. Recall that various UI controls may be provided in each card 86, 90 enabling user adjustments to the UI cards 86, 90.

The underlying system may remember any user adjustments, including chart selections, preference ratings, and so on, for the entered query. Accordingly, the next time the user enters a similar query, the UI cards 86, 90, reflect the previous modifications (the modifications of which generate a type usage context information). Recall that automatically selected UI cards and associated visualizations and visualization types that are initially shown may also incorporate aggregated context information from plural users, and/or extrinsic context information characterizing the user (e.g., data access permissions, data about the enterprise for which the user works, and so on).

Exact details of the content-selection algorithm and system are implementation specific and may be varied to meet the needs of a given implementation, without departing from the scope of the present teachings.

Figure 6:
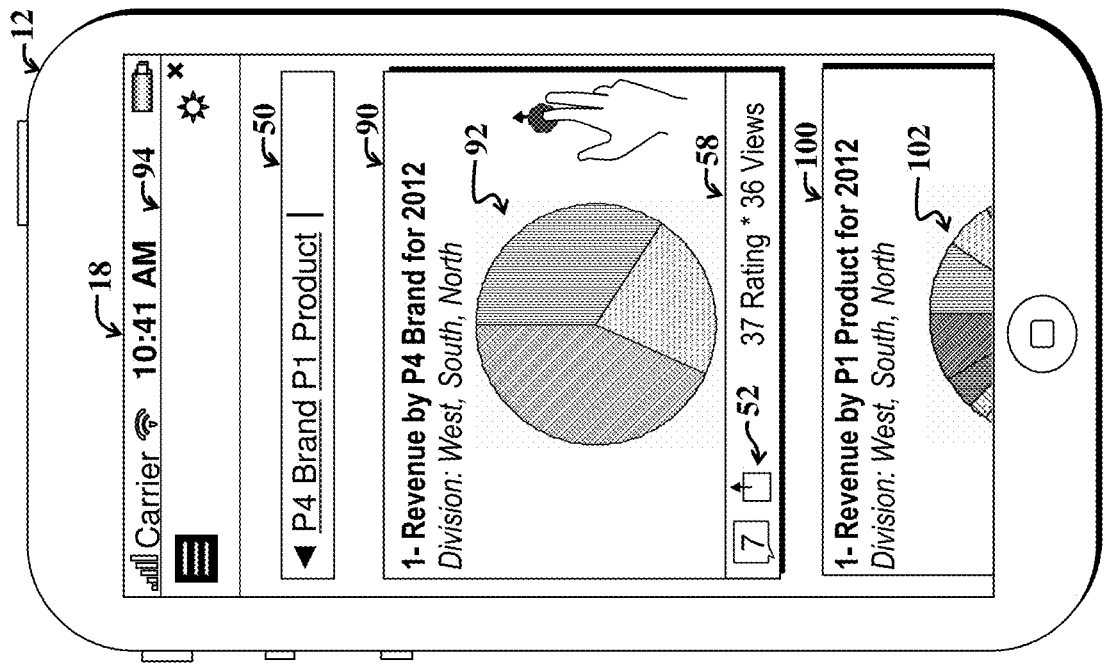
FIG. 6 illustrates second portion of the plural UI cards of FIG. 5, which more clearly shows a second UI card, which represents a filtered version of a first UI card that is shown in FIG. 5.

FIG. 6 illustrates second portion 94 of the plural UI cards 86, 90 of FIG. 5, which more clearly shows (after a vertical scroll of the UI display screen 84 of FIG. 5) the second UI card 90, which illustrates content representing a filtered version of content underlying the first UI card 86 shown in FIG. 5.

The result of the scroll operation applied to the UI display screen 84 of FIG. 5 further reveals a portion of a third card 100 and accompanying third visualization 102. Data underlying the third visualization 102 includes data represented by the first visualization 88 of FIG. 5, but filtered to shown revenue by P1 product for 2012, as opposed to revenue by both P1 product and P4 brand (represented by the first visualization 88) or revenue by just P4 brand (represented by the second visualization 92).

Note that more complex queries entered in the text field 50 may result in display of additional UI cards that facilitate enabling the user to view data associated with the query from different perspectives resulting from application of different filters to the underlying data. By facilitating multiple perspectives of the underlying data, users may more readily understand that data from different visual perspectives, thereby potentially providing additional user insights and a deeper understanding of enterprise content retrieved in response to the search.

Figure 7:
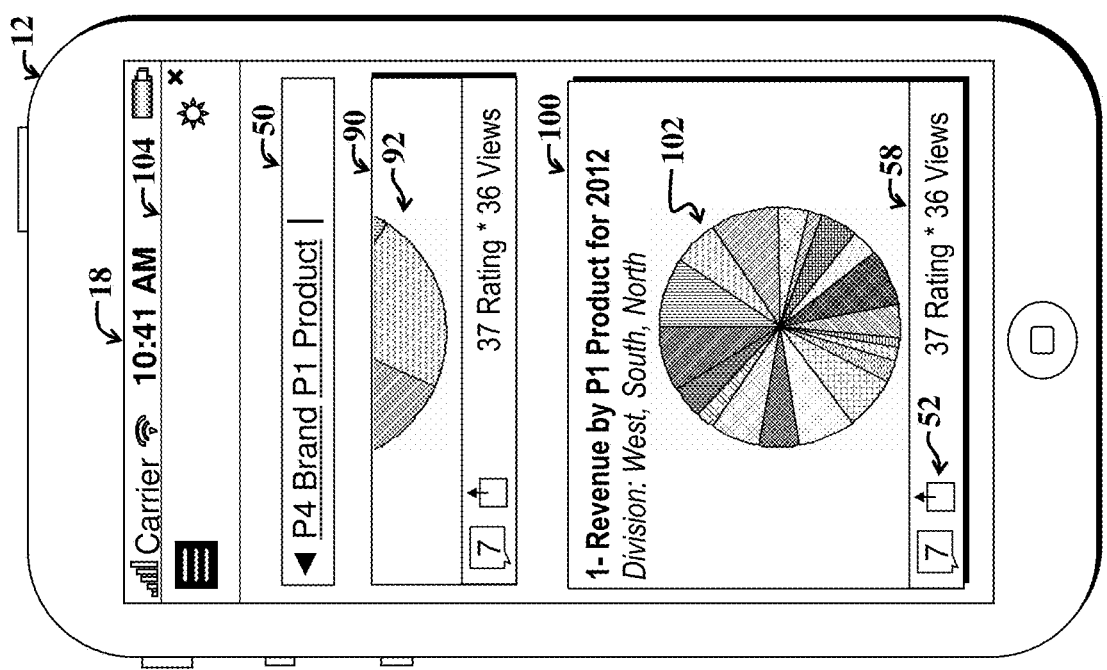
FIG. 7 illustrates a third portion of the plural UI cards of FIG. 5, which more clearly shows a third UI card.

A further UI scroll applied to the second portion 94 of the search results (corresponding to the scrollable listing of cards 86, 90, 100) further reveals the entire third UI card 100, as shown in FIG. 7.

FIG. 7 illustrates a third portion 104 of the plural UI cards 86, 90, 100 of FIG. 5, which more clearly shows the third UI card 100 and accompanying third visualization 102.

In summary, with reference to FIGS. 5-7, three data visualizations 88, 92, 102 included in three respective UI cards 86, 90, 100 are shown. In FIG. 5 the user has entered additional query terms as "P4 Brand" and "P1 Product." The first visualization 88 shown in FIG. 88 is a stacked bar chart that includes revenue, brand and product all in one chart. The user didn't have to specify the format of the visualization as it is determined automatically by the system and offered up as a desirable, or most likely desired, format for viewing the data.

The second visualization 102 (accessed by swiping the display upwards) is a pie chart showing revenue distribution by brand. This chart 102 is one that is automatically suggested by the system as one that the user may be interested in based on the search, while not literally following all the keywords in the search.

Similarly, the third visualization 102 of FIG. 6 is still in response to the same user query and compares revenue by product as an automatically recommended and presented visualization in order to help the user perform data analysis such as to spot trends, anomalies, etc.

FIG. 8 illustrates a fifth example UI display screen 114 showing example query entry functionality, enabling users to select among plural meanings for entered natural language terms, and in this case, to select among different types of charts or visualizations after entering the term "chart" in the text field 50.

In response to entering the term "chart" as part of a natural language query, the underlying system automatically determines that the user may wish to view chart options. Accordingly another UI card appears 116 with various user options 118 to specify a type of chart to include among the search results returned in response to the portion of the query before the term "chart."

Note that a QWERTY keyboard 120 may also selectively appear among UI display screens to facilitate entering or adjusting the natural language query provided in the text field 50. Alternatively, or in addition, voice entry options may be provided (e.g., as discussed more fully below with reference to FIGS. 15 and 16).

Note that while a listing of UI controls 118 for selecting visualization types is shown in the resulting chart-type UI card 116, that the UI controls may be provided in a different manner, e.g., via another type of visualization picker.

For the purposes of the present discussion, a visualization picker may be any set of user interface controls adapted to enable a user to select a visualization type from among plural visualization types. The set of user interface controls may be implemented via a widget, form, questionnaire, and/or other mechanisms. For an alternative visualization picker (as an alternative to the list 118) may include an interactive graphic with various buttons that may be user selected to register user selection of a visualization type and/or sub-type.

In summary, if the user wants to see different visualizations than the charts initially provided, the user can position the cursor in the text field 50 and type the word "chart" or select that option by other means. This brings up a list 118 of different types of charts as shown in FIG. 8.

Figure 9:
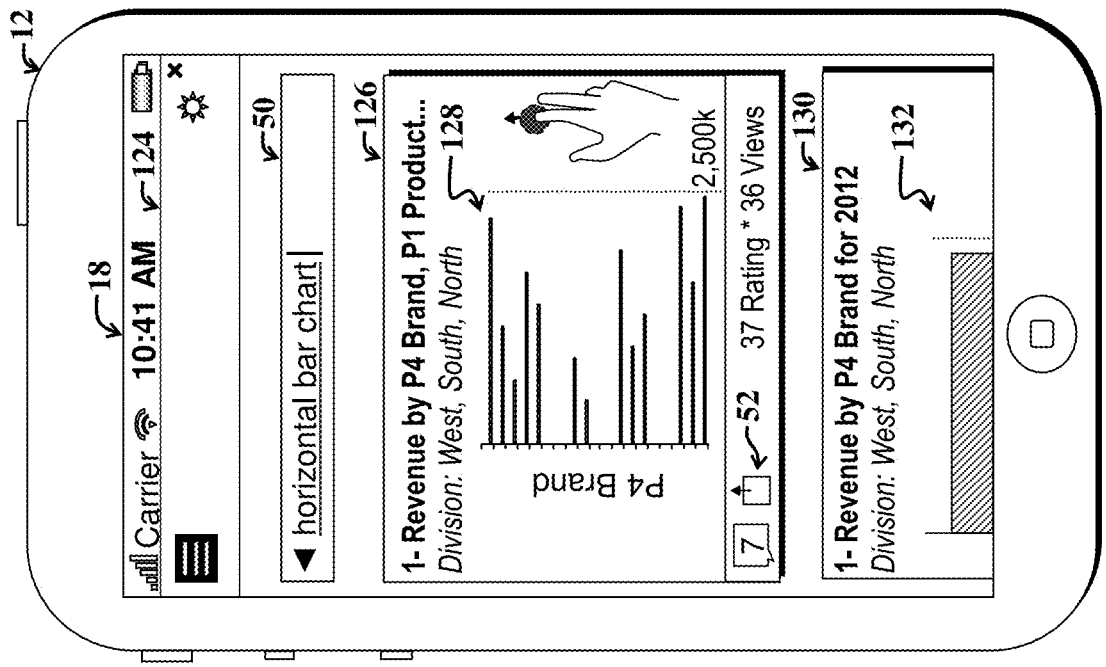
FIG. 9 illustrates a sixth example UI display screen showing a first portion of a set of plural UI cards responsive to a query (including the term "horizontal bar chart") entered and/or selected via the UI display screen of FIG. 8.

FIG. 9 illustrates a sixth example UI display screen 124 showing a first portion 126, 130 of a set of plural UI cards responsive to a query (including the term "horizontal bar chart") entered and/or selected via the UI display screen of FIG. 8.

The first portion 126, 130 includes a first UI card 126 and a second UI card 130 illustrating a first horizontal bar chart 128 with all of the data dimensions of the query entered in the text field 50, and a second horizontal bar chart 132 with one of the dimensions filtered or removed from the underlying data.

In summary, FIG. 9 shows the display after "horizontal bar chart" has been selected. A horizontal bar chart using the same data as in the prior charts is added to the list of displayed charts. In a preferred embodiment, the newly selected chart replaces the top most chart.

Figure 10:
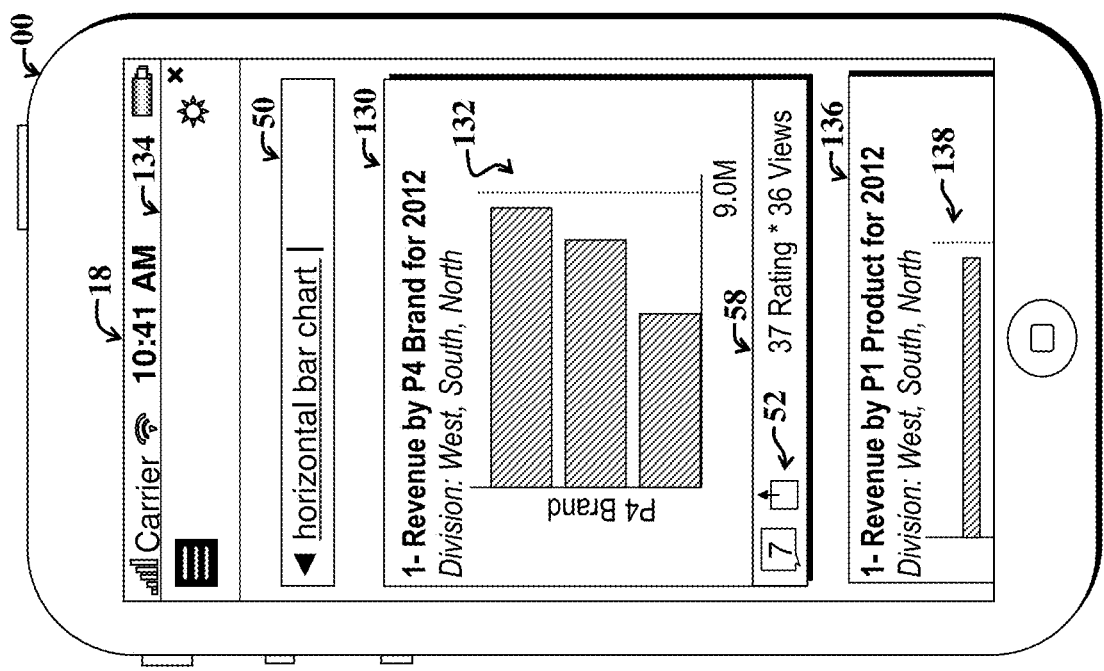
FIG. 10 illustrates a second portion of the set of plural UI cards of the sixth UI display screen of FIG. 9.

FIG. 10 illustrates a second portion 134 of the set of plural UI cards 126, 130, 136 that were generated and displayed in response to the query as entered and shown in the UI display screen 124 of FIG. 9. The second portion 134 may appear in response to a vertical scroll applied to the UI display screen 124 of FIG. 9. FIG. 9 reveals the entire UI card 130 that is only partially shown in FIG. 9.

The vertical scroll applied to the UI display screen 124 of FIG. 9 also reveals a portion of an additional UI card 136 and accompanying horizontal bar chart 138, the underlying data of which represents a filtered version of data in the first UI card 126 of FIG. 9.

Note that a given UI card, e.g., the UI card 130 may be expanded to occupy a larger display area, e.g., to occupy an entire area of the UI display screen 134.

Figure 11:
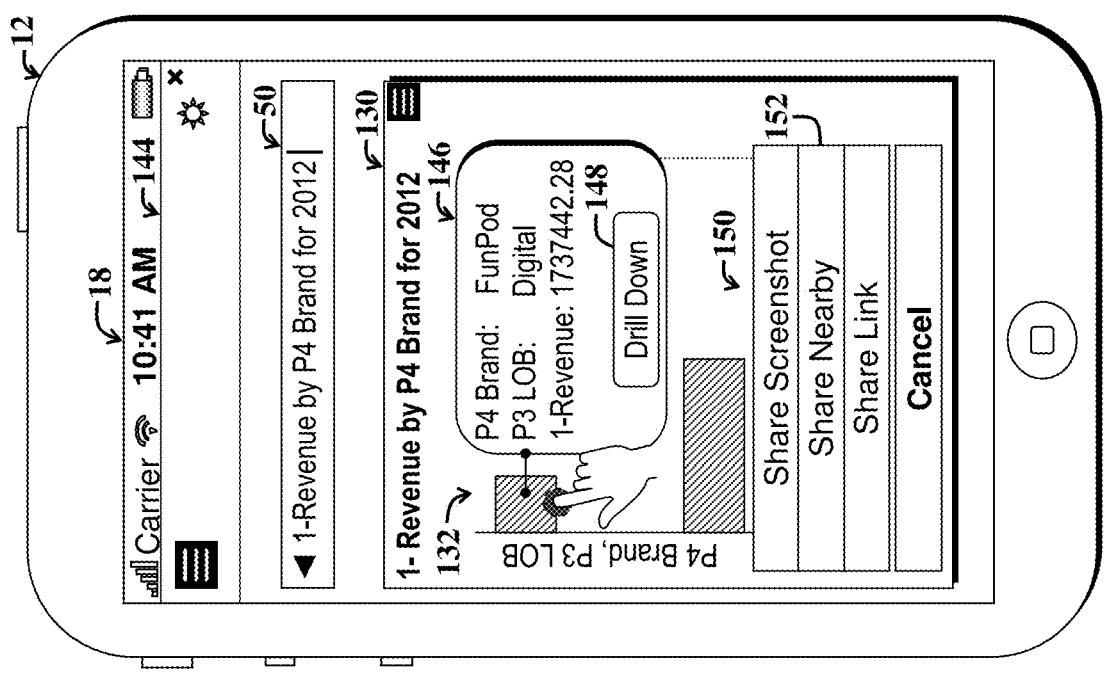

FIG. 11 illustrates a seventh example UI display screen 144 showing various user options 146, 150 for interacting with content of a selected UI card, including drilling 148, sharing a live chart or screen shot thereof, sharing content with nearby users, and so on. Note that annotation options may be revealed in response to user selection of one of the UI controls 150.

User selection of a share nearby option 152 may trigger display of a subsequent UI display screen with additional options for configuring content to be shared with nearby users. Functionality for sharing content with nearby users may leverage various communication mechanisms, e.g., Bluetooth, WiFi, etc., and location information associated with surrounding users.

Content to be shared nearby may be automatically filtered by the underlying mobile application (e.g., the client software 20 of FIG. 1) and/or by the server system 14 before delivery to nearby users. The content may be filtered in accordance with data access permissions associated with various nearby users.

Note that in some implementations of the share nearby functionality, may determine nearby users that are within communication range of native device transceivers, e.g., Bluetooth. Alternatively and/or in addition, the server system 14 of FIG. 1 may automatically determine which users are near by a particular user that has chosen to share content. The determination may be done by referencing stored context information pertaining to other users, the context information of which may be maintained via the context repository 30 of FIG. 1. Use of the server system 14 of FIG. 1 may further facilitate filtering delivered content in accordance with data access permissions of the various nearby users.

In summary, FIG. 11 shows the screen after a user has "opened up" the "revenue by brand" chart of FIGS. 9 and 10 to show additional details, fields and controls. Other characteristics can be shown for more detail and control. FIG. 11 further shows options 150 for sharing visualizations or other information associated with the data. Visualizations, or portions thereof, including annotations or additional information can be shared using the device's standard communication channels such as email, text, etc. for a smartphone or other computing device.

Figures 12, 13:
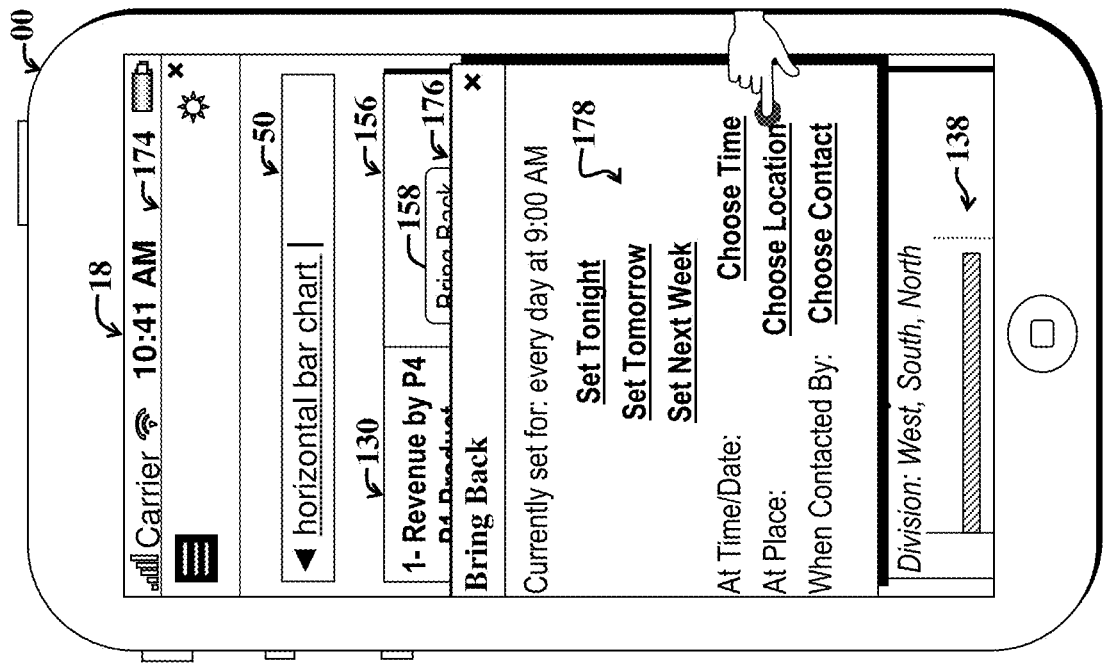

FIG. 12 illustrates a eighth example UI display screen 154 showing additional user options 158-166 (e.g., UI controls) for interacting with a UI card 130, including an option 158 to selectively bring back or redisplay the card 130, an option 160 to add the card 130 to a home screen or activity feed, an option 162 to not show the UI card 130, an option 164 to flip the UI card 156, and an option 166 to annotate the card. The UI display screen 154 of FIG. 12 appears when the user activates an options panel 156, e.g., by swiping left on an edge of the UI card 130.

Note that the various UI controls 158-166 are merely examples and that more or fewer UI controls may be included in the panel 156 and/or in menus (e.g., tap and hold menus) or other UI mechanisms for enabling display of additional UI controls.

User selection of one of the UI controls 158-166 may trigger display of an additional window, which may include additional UI controls and user access to functionality for triggering implementation of associated software actions. For example, user selection of a flip card option 164 may reveal additional UI controls and details about the UI card 130 that may appear as though they are on the back of the UI card 130.

User selection of the don't show UI control 162 may trigger display of additional options for specifying whether selection of the "don't show" option 162 will act to permanently remove the UI card 130 from the UI display screen, such that it will not appear again, or whether the UI card 130 should simply be removed from the current screen 154 and remain available for redisplay later. Note that, in certain implementations, user selection of the don't show UI control 162 automatically triggers both removal of the UI card 130 from the UI display screen 154 and further augments context information usable by the underlying system to estimate a usefulness of the UI card 130.

When the card is dismissed, this dismissal information can then affect subsequent query search results, e.g., display of the UI card 130 may be allocated a lower priority for not just the current user, but other users, especially of some of the other users have also dismissed the card 130 after it has appeared in search results (i.e., UI cards) in response to a similar query as that entered in the text field 50.

User selection of the annotate option 166 may reveal an additional menu, panel, toolbar, or other UI features that provide controls to draw on, make notes on, or otherwise annotate the UI card 130, e.g., in preparation for sharing, saving, etc.

User selection of the UI control 160 for adding the UI card 130 to the feed (i.e., home screen feed, also called smart feed) may trigger inclusion of the UI card 130 among the feed or listing of cards appearing upon user login into the underlying software.

User selection of the bring back UI control 158 may trigger display of an additional window with additional UI controls for enabling a user to specify a condition, which if met, results in redisplay of the UI card 130 in the UI display screen shown to the user. The specified condition may represent specified intrinsic context information, which is then compared to extrinsic context information gathered by the underlying system, to determining when the intrinsic context matches the associated extrinsic context. When a match occurs, the UI card 130 is redisplayed if it is not currently displayed in the UI display screen that the user is currently interacting with, as discussed more fully below with reference to FIG. 13.

In summary, FIG. 12 illustrates a feature referred to as "bring back" that allows a user to have a selected UI card and associated visualization automatically generated and loaded into a device's memory, application, dashboard, home screen or other visible or non-visible location. In FIG. 12, as the user is viewing the "revenue by product for 2012" UI card 130, they can perform an input action to select the bring back feature, e.g., by performing a swipe to the left followed by selecting the bring back UI control 158. After invoking display of the panel 156, which is displayed adjacent to a subject visualization of the UI card, and after selecting the bring back option 158, additional bring back options or UI controls are provided.

Note that in other embodiments, the controls 158-166 may be associated with the subject UI card and/or visualization in any suitable manner. Furthermore, note that the various options 158-166 may be applicable to other types of UI cards, not just analytic cards with visualizations.

FIG. 13 illustrates a ninth example UI display screen 174 showing a pop up window 176 displayed responsive to user selection of the bring back option 158 from the eighth UI display screen 154 of FIG. 12. The pop up window 176 includes additional user options 178 (e.g., UI controls) for facilitating user specification of bring back conditions, e.g., time, place, when contacted by, and so on.

In summary, upon pressing the "bring back" button 158 of FIG. 12, the window 176 shown in FIG. 13 appears to allow the user to specify the conditions under which the UI card 130 and associated visualization will be loaded in the future. The visualization will use the same format but will incorporate the future data that will be available at the time of loading. Types of conditions that the user can specify include time, place and person. So for example, every day at 8 am, every Monday at 8 am, when the user (or user's device) is determined to be at a customer's site, whenever a particular person contacts the device/user by phone, text, email, etc., the visualization can be loaded and displayed on the user's home screen or other area. The condition for updating and loading the visualization and data can be automated so that the user need not manually specify the condition but, instead, the system will derive a condition.

FIG. 14 illustrates a tenth example UI display screen 184 showing additional user options 192 for specifying a bring back condition pertaining to a particular device location or region. The UI display screen 184 may appear in response to user selection of a choose location option from among the options 178 indicated in the window 176 of FIG. 13.

In the present example use case, a user has entered "Proctor" into text field 190, resulting in display of candidate matches 192 for the term "Proctor." The candidate matches may be derived in view of stored context information, where each candidate match may represent or be associated with a computing object and/or data dimension maintained in an enterprise database, e.g., a BI database.

The user may select an option from the list 192 and/or may manipulate an associated map 194 to perform selection of a location or region used to trigger redisplay, i.e., "bringing back" the UI card 130 of FIGS. 10, 12, and 13 when the mobile device 12 enters the selected region 196 and/or is at the specified location.

Figure 15:
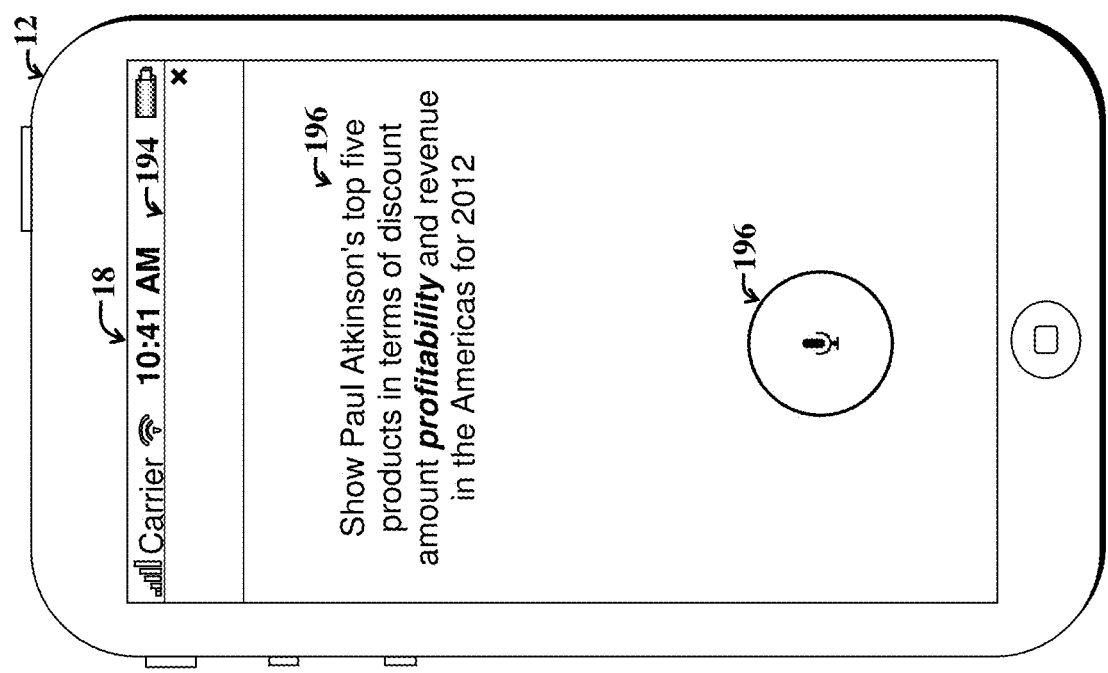
FIG. 15 illustrates an eleventh example UI display screen showing use of voice to input a natural language query to selectively retrieve BI content.

FIG. 15 illustrates an eleventh example UI display screen 194 showing use of voice to input a natural language query to selectively retrieve BI content. In the present example embodiment, a voice icon 196 indicates that voice entry mode is activated. A user is specifying a detailed natural language query 196, which may be processed as a whole expression and need not prompt the user to select options for each term of the expression 196.

Note that use of the system in text entry mode, e.g., as shown in FIGS. 3-14 (and particularly in FIGS. 8 and 14) may train the underlying system to facilitate more accurate processing of terms provided via voice input. For example, previous user selections confirming association of the term "profitability" (when operating in manual text entry mode) with a database dimension and/or object called "profit margin" may be leveraged by the underlying system to accurately associate profitability with profit margin.

Note however, that even in absence of prior training (whereby additional context information is gathered and leveraged), the underlying system and associated inference engine (e.g., the inference engine 38 of FIG. 1) may be able to guess or estimate which database dimension that the term "profitability" refers to. For example, such determination may be determined in part by analysis of word stems (e.g., the profit portion of the term "profitability") and comparison of the stems with existing database dimensions.

Figure 16:
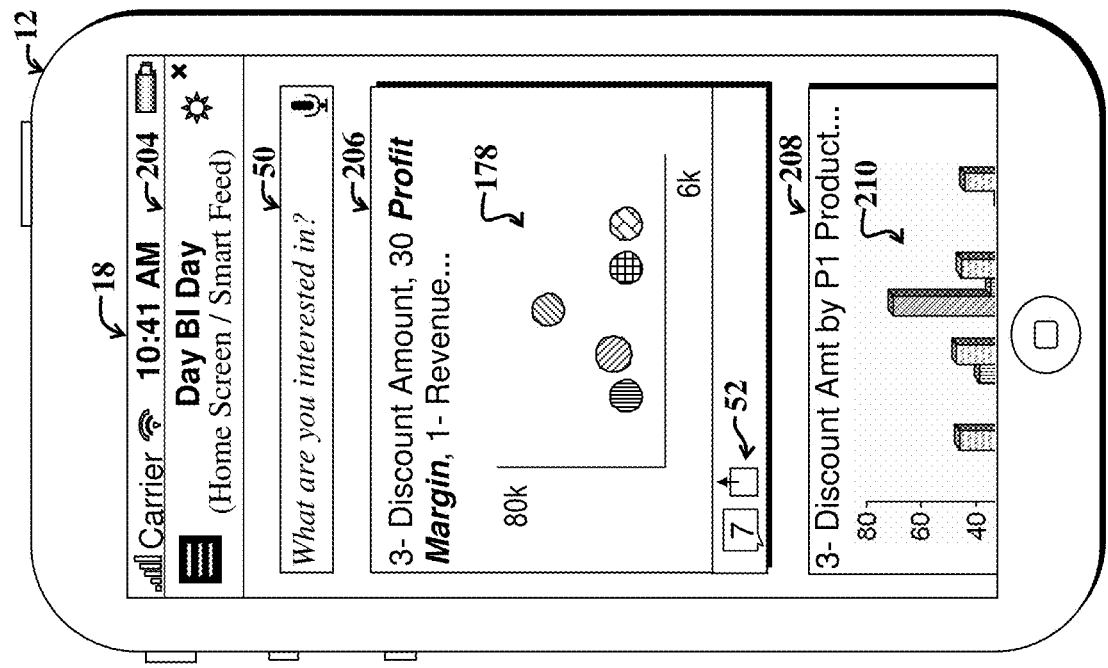
FIG. 16 illustrates a twelfth example UI display screen appearing after the voice query indicated in FIG. 15.

FIG. 16 illustrates a twelfth example UI display screen 204 appearing after the voice query 196 indicated in FIG. 15. Note that the system has interpreted the term "profitability" to refer to "profit margin," and a corresponding series of UI cards 206, 208 are then generated (along with respective visualizations 178, 210) in accordance with a context-based estimate of user intent derived by the underlying system.

Figure 17:
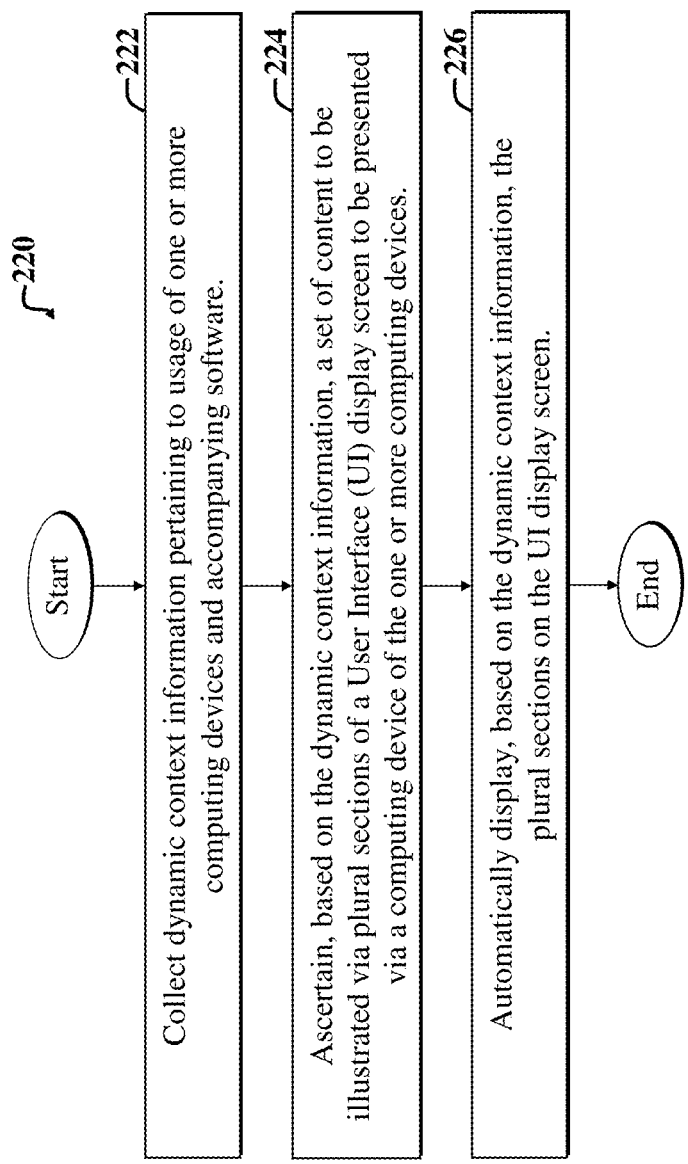
FIG. 17 is a flow diagram of a first example method suitable for use with the embodiments of FIGS. 1-16.

FIG. 17 is a flow diagram of a first example method 220 suitable for use with the embodiments of FIGS. 1-16. The example method 220 facilitates conveying electronic content between user devices and other resources of a computing environment. For the purposes of the present discussion, electronic content may be any content conveyed using electronics and/or electromagnetic energy.

The first example method 220 includes an initial context-collection step 222, which involves collecting dynamic context information pertaining to usage of one or more computing devices and accompanying software. The usage may refer to context information specific to a particular user, but is not limited thereto. The usage may also refer to aggregated usage associated with aggregated context information.

Next, a content-ascertaining step 224 includes using the dynamic context information to ascertain or otherwise determine or calculate a set of content to be illustrated via plural sections of a UI display screen, where the plural sections (e.g., UI cards) to be presented via a computing device (e.g., the client device 12 of FIGS. 1-16) of the one or more computing devices.

Finally, an automatic-displaying step 226 includes automatically displaying, based on the dynamic context information, the plural sections on the UI display screen.

The method 220 may be altered, augmented, or replaced, without departing from the scope of the present teachings. For example, more narrow recitations of the method 220 may further specify that the context information includes user input provided through user interaction with a software UI display screen.

The context information may further include natural language input, such as a query. The context information may further include information indicating who a user of a computing device of the one or more computing devices has been communicating with and a subject matter related to communications between the user and one or more other users. The context information may further include information provided via user input, such as information indicating a particular time of day (and/or date, day of week, etc.) relevant to content to be displayed at the particular time. The context information further includes information associating a particular location or region with particular content to be displayed when a computing device of the user is at the particular location or within the region.

The computing environment may be an enterprise computing environment, wherein the software includes BI software. For the purposes of the present discussion, BI software may be any enterprise software with one or more features and/or software functionality for performing or otherwise facilitating business analysis, e.g., analysis involving identifying business needs, determining solutions for business problems, facilitating informed business decisions, etc.

The set of content may include dynamic content that is selectively updated, e.g., as the one or more computing devices (representing user devices) and associated users interact with software (e.g., BI software, such as client software, BI server software, enterprise database software, and so on) used to implement the method.

The set of content determined in the content-ascertaining step 224 may include content illustrated via plural visualizations (e.g., charts, graphs, etc.). Each of the plural visualizations may be presented, i.e., displayed, on a separate UI card, each UI card representing a section of the plural sections.

Each of the plural visualizations may include an interactive visualization. The interactive visualization may incorporate and or be included in a UI card that incorporates one or more UI controls for filtering underlying data of the interactive visualization. The one or more UI controls may include a control for enabling filtering of the underlying data by time frame using natural language input that specifies a time frame.

The underlying data may include dynamic content (e.g., content subject to daily change) sourced from a database, e.g., one or more enterprise databases. The method 220 may further specify a step involving providing one or more UI controls for enabling sharing the interactive visualization with one or more devices (and thereby one or more associated users) that are in proximity to a device that is displaying the interactive visualization. The method 220 may be further augmented to recite providing one or more UI controls for enabling changing a type of the interactive visualization.

An example alternative method that may replace and/or be used with the method 220 includes a method for facilitating content determination and delivery in a computing environment, e.g., a networked enterprise computing environment. The example alternative method includes determining context information pertaining to user interaction with a first mobile computing device that is operating within the computing environment; and selectively pushing content to the first mobile computing device based on the context information, wherein content includes content derived from a BI database and presented via one or more UI cards on a UI display screen of the mobile computing device.

The alternative method may also leverage dynamic context information. In addition, the content derived from a BI database may include dynamic content, such that changes to the dynamic context information and changes to data stored in the BI database result in updated content being represented via the one or more UI cards. The updated content may be updated in response to a change to the data stored in the BI database and used to render the one or more cards and dynamic content thereof.

The alternative method may further specify that the one or more UI cards include an activity stream associated with activities of a user of the first mobile computing device. The activity stream includes a blog (and/or other updating data) with information pertaining to communications between collaborators of a user of the first mobile computing device.

A first UI control may facilitate initiating an operation to share the one or more UI cards with one or more additional mobile computing devices in proximity to the first mobile computing device. The one or more additional mobile computing devices may run operating systems that are different that the operating system running on the first mobile computing device. Accordingly, embodiments may include cross-platform and/or platform-independent content sharing.

The alternative method may further include employing native content sharing functionality (e.g., content sharing functionality provided by and/or delivered with or otherwise preexisting or running on a mobile device)) of the first mobile computing device and the one or more additional mobile computing devices to trigger transfer of content represented by the one or more UI cards to the one or more additional mobile computing devices.

The content may include dynamic content, e.g., an interactive visualization constructed using one or more natural language terms of a search query entered via the first mobile computing device. The one or more natural language terms may be associated with one or more data dimensions maintained via the BI database. The one or more data dimensions include data used to construct the interactive visualization.

The interactive visualization may be included within a first UI card. The first UI card may include one or more UI controls configured to trigger delivery of an instance of the first UI card to a specified contact of the user of the first mobile computing device.

The interactive visualization may be included within a first UI card. The first UI card may include one or more UI controls configured to allow user specification of a condition to redisplay the first UI card. The condition to redisplay the first UI card may include a condition specifying redisplay of the first UI card at a particular future time.

The condition to redisplay the first UI card may include a condition specifying selective redisplay of the first UI card when the first mobile computing device is approximately at a user-specified location. The condition to redisplay the first UI card may include a condition specifying redisplay of the first UI card when the first mobile computing device receives a communication from a second computing device from a particular contact of a user of the first mobile computing device.

The context information may include dynamic context information that includes usage history associated with the first mobile computing device. The dynamic context information may further include location information associated with the first mobile computing device. The dynamic context information may further include usage history associated with plural mobile computing devices included in the computing environment.

Figure 18:
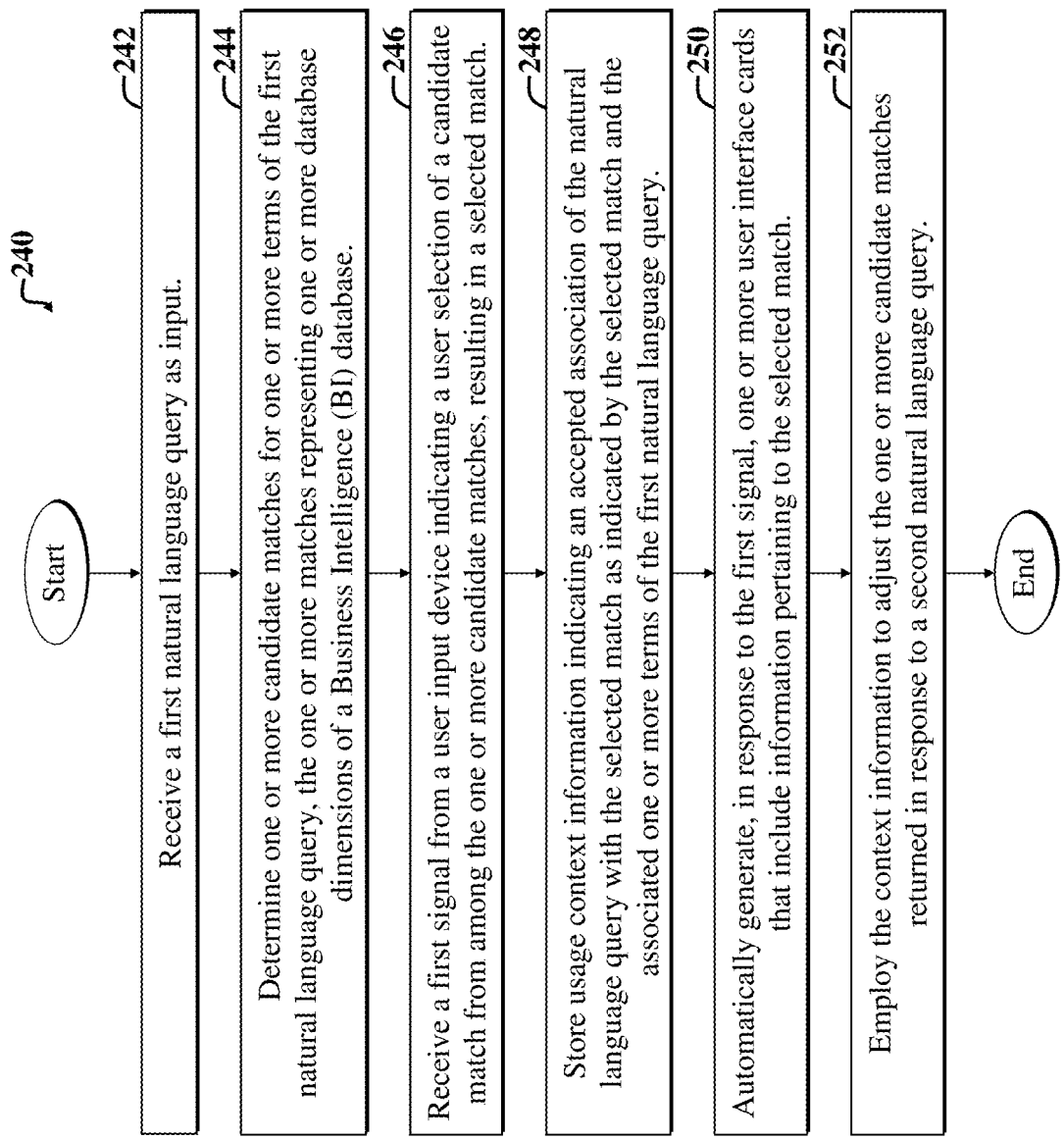
FIG. 18 is a flow diagram of a second example method suitable for use with the embodiments of FIGS. 1-17.

FIG. 18 is a flow diagram of a second example method 240 suitable for use with the embodiments of FIGS. 1-17. The second example method 240 facilitates selecting and displaying content, e.g., enterprise data, analytics, etc.

The second example method 240 includes a first receiving step 242, which involves receiving a first natural language query as input.

A second determining step 244 includes determining one or more candidate matches for one or more terms of the first natural language query. The one or more matches may represent one or more database dimensions of a BI database and/or other enterprise database.

A third receiving step 246 includes receiving a first signal from a user input device, wherein the first signal indicates a user selection of a candidate match from among the one or more candidate matches, resulting in a selected match.

A fourth storing step 248 includes storing usage context information. The stored usage context information indicates an accepted association of the natural language query with the selected match as indicated by the selected match and the associated one or more terms of the first natural language query.

A fifth generating step 250 includes automatically generating, in response to the first signal, one or more UI cards that include information pertaining to the selected match.

Finally, a sixth employing step 252 includes employing the context information to adjust the one or more candidate matches returned in response to a second natural language query.

Note that the method 240 may be altered, without departing from the scope of the present teachings. For example, the method 240 may further recite that the natural language input includes voice input. A natural language sentence provided via the voice input may represent or be treated as a single term of the one or more terms for the purposes of interpreting and/or parsing the meaning(s) of the voice input.

The information pertaining to the selected match may include information represented by an interactive visualization. The interactive visualization may include a first UI mechanism (e.g., UI control) that includes one or more drill down operations. Another mechanism may enable one or more data filtering operations to select, add, or omit data underlying the interactive visualization.

The interactive visualization may be included or displayed within a UI card that includes one or more UI controls (e.g., natural language input field, e.g., a text input field and/or voice text field) for enabling a user to change a type of the visualization.

The second example method 240 may be further modified to include determining when the natural language input has been entered via voice input, and then employing the voice input to automatically generate the first signal to yield the candidate match.

The fifth generating step 250 may further include automatically displaying plural UI cards on a UI display screen of a mobile computing device. Each of the plural UI cards may include a visualization illustrating one or more database dimensions associated with the one or more terms of the natural language query.

The plural UI cards may include a first UI card that includes a first visualization illustrating representations of all database dimensions indicated by the one or more terms.

The plural UI cards may include a second UI card that includes a second visualization illustrating representations of a subset of all dimensions indicated by the one or more terms. A first UI control may facilitate enabling a user to dismiss a card from among the plural UI cards.

The second example method 240 may further include, in response to a dismissal of the card, storing dismissal information indicating that the card was dismissed, the dismissal information included among the context information. The context information may further include selection information and dismissal information associated with plural users of a software application used to facilitate implementing the method.

The third receiving step 246 may further include determining one or more content topics in accordance with a first user selection from a list of candidate matches associated with the one or more content topics; automatically triggering a second search in accordance with a second signal that indicates a second user selection from among the one or more candidate matches; and displaying search results as plural visualizations, wherein each of the plural visualizations includes information pertaining to the one or more database dimensions and the second user selection. The one or more of the plural visualizations may further include one or more analytics derived from data characterizing the one or more database dimensions.

The second example method 240 may further include providing a second UI control enabling a user to remove one or more candidate matches from the list of candidate matches; storing an updated association between the one or more terms of the natural language query and remaining candidate matches of the list of candidate matches, the remaining candidate matches remaining displayed via a UI card after removal of the one or more candidate matches from the list; and using the context information to adjust a subsequently displayed list of candidate matches in response to a natural language query that would otherwise return candidate matches that have previously been dismissed via the second UI control.

Figure 19:
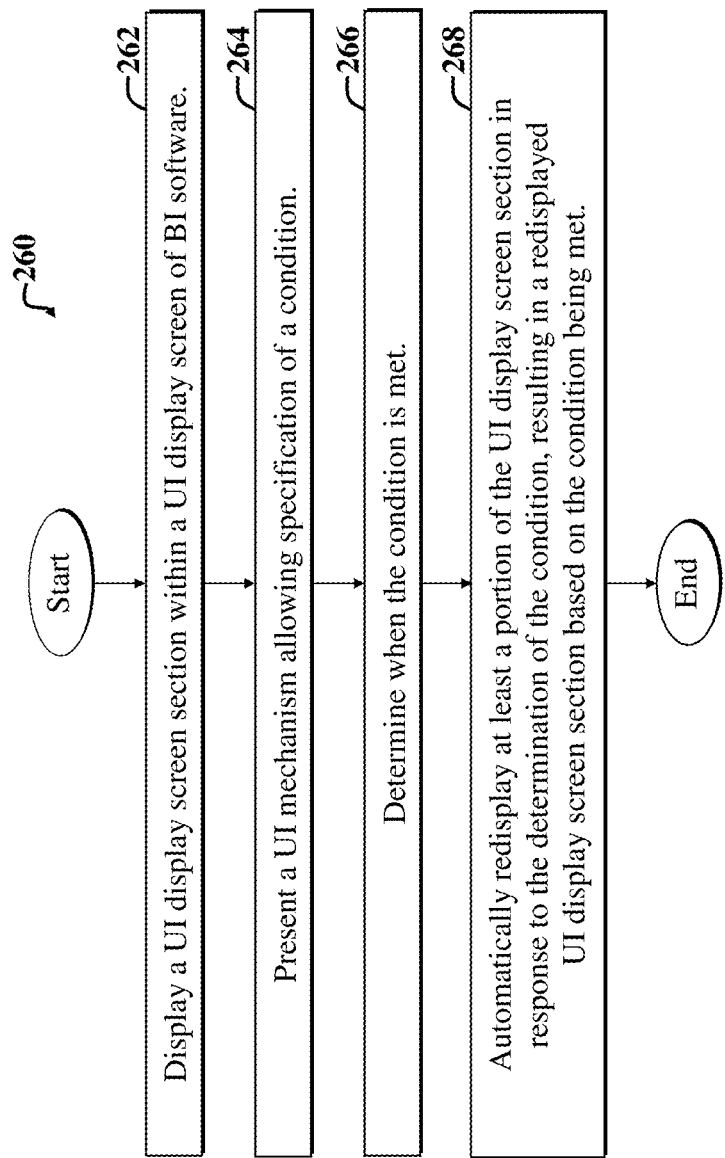
FIG. 19 is a flow diagram of a third example method suitable for use with the embodiments of FIGS. 1-18.

FIG. 19 is a flow diagram of a third example method 260 suitable for use with the embodiments of FIGS. 1-18. The third example method 260 facilitates presenting (i.e., displaying) UI display screen sections, e.g., UI cards.

The third example method 260 includes a first step 262, which involves displaying a UI display screen section within a UI display screen.

A second step 264 includes presenting a UI mechanism allowing specification of a condition.

A third step 266 includes determining when the condition is met.

A fourth step 268 includes automatically redisplaying at least a portion of the UI display screen section in response to the determining, resulting in a redisplayed UI display screen section based on the condition being met.

The third example method 260 may be altered, without departing from the scope of the present teachings. For example, the third step 266 may further include determining when the condition is met after the UI display screen section has been closed but while software for facilitating implementing the method is running.

The fourth step 268 may further specify automatic redisplaying of a UI card based on the condition being met, wherein the redisplayed UI card includes an interactive visualization; wherein underlying data of the interactive visualization includes structured enterprise data derived from an enterprise database; wherein the enterprise data includes one or more database dimensions associated with one or more portions (e.g., slice of a pie chart) of the interactive visualization.

The UI display screen section may include plural UI display screen sections. The plural UI display screen sections may include one or more visualizations that are displayed within one or more of the plural UI display screen sections.

The plural UI display screen sections may include one or more UI cards configured for display on the computing device, e.g., a mobile computing device.

The one or more UI display screen cards may represent an activity feed (also called a smart feed, home screen feed, dashboard feed, series of dynamic UI cards representing selectively pushed content based on context, including dynamic context). Each of the one or more UI display screen cards may be automatically selected for display based on usage context information derived from user interaction with software used to implement the method.

The UI mechanism may include one or more UI controls for enabling user specification of at least one aspect (e.g., time, location, contact, communication mode of contact, e.g., voice mode, email, text message communication, etc.) of the condition. The aspect may be based on user-specified context information.

The third step 266 may further include comparing the user-specified context information with dynamic context information to determine if the context information matches; then, in response to a match, determining that the user-specified condition has been met.

The user-specified context information may include a particular geographical location or region, such that when the mobile computing device is at the location or within the region, the condition is met. The user-specified context information may further include and/or alternatively include data indicating a particular time, person, or contact of a user of the UI display screen.

The third step 266 may further include using both the user-specified context information and additional context information to determine if the condition is met. The additional context information may further include information indicating that the user has been contacted by the particular person.

The third step 266 may further include determining a communication mode employed by a user to communicate with the contact, and providing a UI control enabling initiation of a communication session between the user and the contact via the communication mode when the condition is met. The communication mode may include, for example, one or more of the following modes: electronic text-based messaging mode (e.g., Short Message Services (SMS) text communication mode), voice mode (e.g., telephone communications, video conferencing (e.g., using Voice Over Internet Protocol (VOIP))).

The third example method 260 may further include automatically specifying the condition using an inference derived from context information, wherein automatically specifying further includes: employing an inference engine to automatically specify the condition using context information to make an inference used to determine the condition.

The UI display screen section may include an activity feed comprising one or more UI display screen cards. The one or more UI display screen cards may include one or more automatically determined UI display screen cards that are automatically determined, at least in part, on usage history of software used to implement the method. The usage history may represent dynamic context information that is selectively updated as a user interacts with the computing device and accompanying software used to implement the method.

The UI mechanism may be displayed on the UI display screen while at least a portion of the visualization is displayed. The UI display screen may represent a home screen (e.g., dashboard with a smart feed, i.e., activity feed) of software used to implement the method.

The third example method 260 may be further used with and/or be replaced with a method that includes the following steps: receiving a natural language input query, the natural language input query representing intrinsic context information; accessing dynamic extrinsic context information; using the intrinsic context information and the extrinsic context information to select and display one or more interactive visualizations; providing one or more UI controls enabling specification of the condition; comparing the condition with extrinsic context information to determine when the condition is met; and when the condition is met, automatically displaying an updated version of the one or more interactive visualizations when software used to implement the method is active, the software used to implement the method including software running on the computing device.

Figure 20:
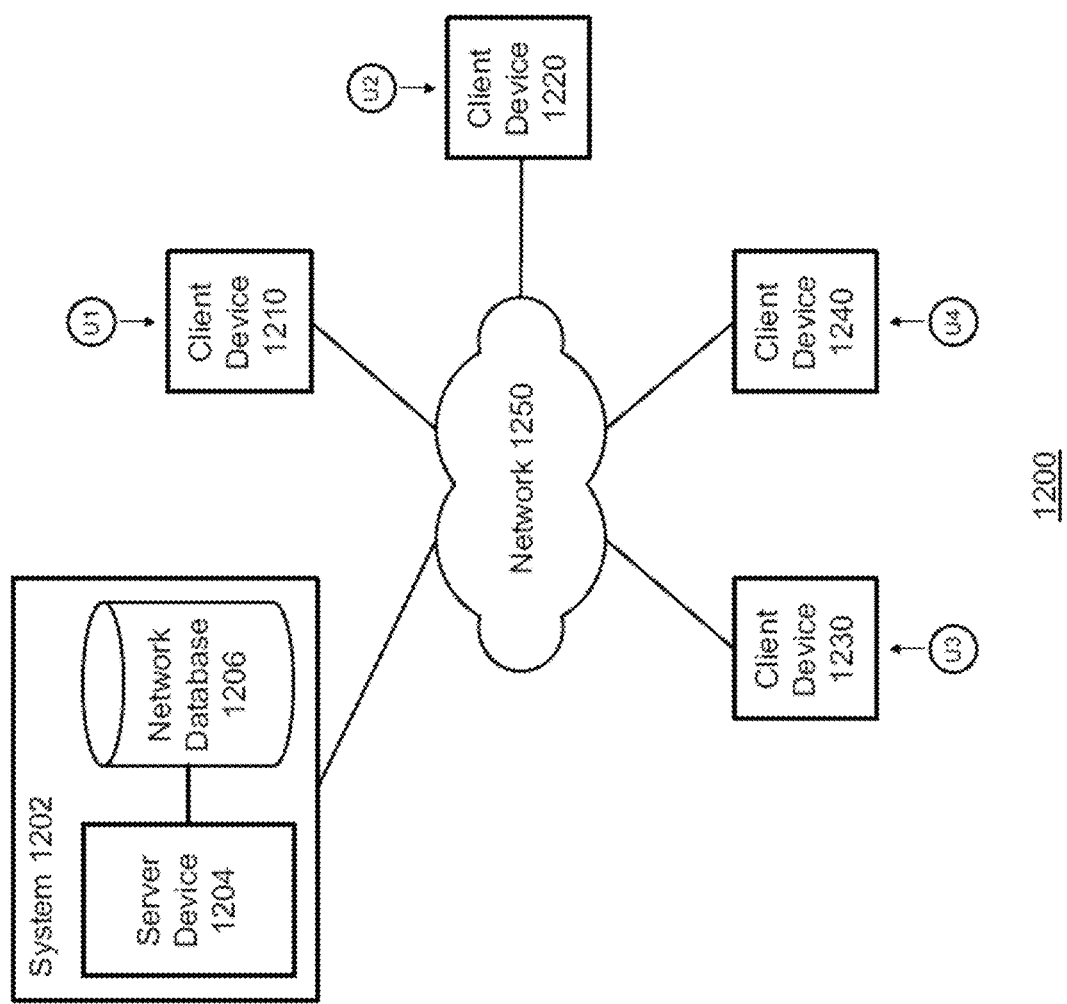
FIG. 20 illustrates an example generic system and computing environment suitable for implementation of various embodiments discussed herein.

FIG. 20 illustrates an example generic system and computing environment suitable for implementation of various embodiments discussed herein. FIG. 20 includes a block diagram of an example network environment 1200, according to some implementations. In some implementations, network environment 1200 includes a system 1202, which includes a server device 1204 and a network database 1206. Network environment 1200 also includes client devices 1210, 1220, 1230, and 1240, which may communicate with each other directly or via system 1202. Network environment 1200 also includes a network 1250.

For ease of illustration, FIG. 20 shows one block for each of system 1202, server device 1204, and network database 1206, and shows four blocks for client devices 1210, 1220, 1230, and 1240. Blocks 1202, 1204, and 1206 may represent multiple systems, server devices, and network databases. Also, there may be any number of client devices. In other implementations, network environment 1200 may not have all of the components shown and/or may have other elements including other types of elements instead of, or in addition to, those shown herein. In various implementations, users U1, U2, U3, and U4 may view metrics data using respective client devices 1210, 1220, 1230, and 1240.

While system 1202 of FIG. 20 is described as performing the steps as described in the implementations herein, any suitable component or combination of components of system 1202 or any suitable processor or processors associated with system 1202 may perform the steps described.

Figure 21:
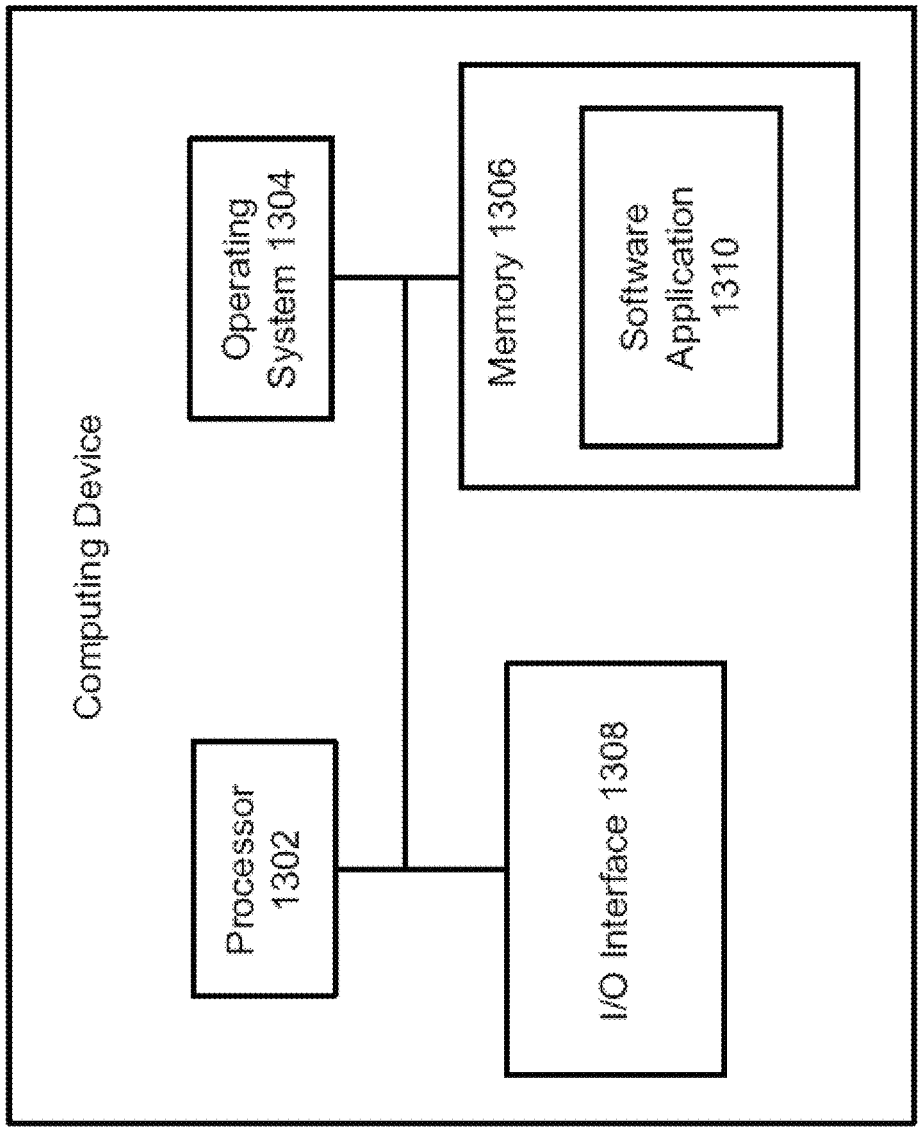
FIG. 21 illustrates an example generic client computing device suitable usable with the generic system of FIG. 20.

FIG. 21 illustrates an example generic client computing device suitable usable with the generic system of FIG. 20. FIG. 21 includes a block diagram of an example computing system 1300, which may be used for implementations described herein. For example, computing system 1300 may be used to implement server device 1204 of FIG. 17 as well as to perform the method implementations described herein. In some implementations, computing system 1300 may include a processor 1302, an operating system 1304, a memory 1306, and an input/output (I/O) interface 1308. In various implementations, processor 1302 may be used to implement various functions and features described herein, as well as to perform the method implementations described herein. While processor 1302 is described as performing implementations described herein, any suitable component or combination of components of system 1300 or any suitable processor or processors associated with system 1300 or any suitable system may perform the steps described. Implementations described herein may be carried out on a user device, on a server, or a combination of both.

Computing device 1300 also includes a software application 1310, which may be stored on memory 1306 or on any other suitable storage location or computer-readable medium. Software application 1310 provides instructions that enable processor 1302 to perform the functions described herein and other functions. The components of computing system 1300 may be implemented by one or more processors or any combination of hardware devices, as well as any combination of hardware, software, firmware, etc.

For ease of illustration, FIG. 21 shows one block for each of processor 1302, operating system 1304, memory 1306, I/O interface 1308, and software application 1310. These blocks 1302, 1304, 1306, 1308, and 1310 may represent multiple processors, operating systems, memories, I/O interfaces, and software applications. In various implementations, computing system 1300 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments herein are discussed with respect to mobile device BI application implementations, embodiments are not limited thereto. Various embodiments disclosed herein may be adapted for use with virtually any computer, including desktop computers. Furthermore, embodiments are not limited to facilitating conveying BI information, tools, and analytics.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A tangible processor-readable storage device including instructions executable by one or more processors for:
    providing a first User Interface (UI) control for accepting an input query;
    retrieving content in accordance with the input query, resulting in retrieved content;
    displaying the retrieved content in one or more UI cards showing plural visualizations based on the retrieved content, including a first visualization and a second visualization, wherein the first visualization is characterized by plural data dimensions, wherein the second visualization is characterized by a filtered version of the plural data dimensions, wherein the first visualization and the second visualization are displayed simultaneously on a display screen of a user, and wherein at least one of the UI cards is flippable to reveal additional information on the back of the flipped UI card, wherein the additional information is additional relative to the retrieved information;
    providing a second UI control suitable to enable the user to rate a usefulness of one or more of the first visualization or the second visualization; and
    determining which of the one or more UI cards the user prefers based on the rate of the usefulness.

2. The storage device of claim 1, wherein the second UI control is adapted to facilitate enabling a user to dismiss the first visualization, such that a first UI card that includes the first visualization is removed from a UI display screen in which it was displayed.

3. The storage device of claim 2, further including:
    detecting when the second UI control is used for dismissing the first visualization; and
    augmenting context information usable by a software application to facilitate estimating a usefulness of the first UI card based on the dismissing of the first visualization.

4. The storage device of claim 3, further including:
    collecting visualization dismissal information and selection information from plural users of the software application or instances thereof; and
    using the dismissal information and selection information to affect subsequently displayed retrieved content representing query search results.

5. The storage device of claim 3, further including providing a third UI control for enabling flipping of the first UI card.

6. The storage device of claim 3, further including providing a fourth UI control for facilitating enabling a user to provide an annotation associated with the first UI card.

7. The storage device of claim 3, further including providing a fifth UI control for facilitating enabling a first user to share the first visualization and the second visualization, comprising displayed content, with one or more additional users the software application.

8. The storage device of claim 7, wherein the one or more additional users of the software application represent one or more surrounding or nearby users of instances of the software application, wherein the one or more additional users are within communication range of the first user, wherein the communication range is determined by a range of Wi-Fi or Bluetooth used by a first communication device of the first user.

9. The storage device of claim 8, further including selectively filtering content that is shared with the surrounding or nearby users in accordance with one or more data access permissions associated with the one or more surrounding users.

10. The storage device of claim 3, further including providing a sixth UI control for facilitating sharing a portion of the UI display screen.

11. A method for facilitating retrieval of, display of, and interaction with sought content, the method comprising:
providing a first User Interface (UI) control for accepting an input query;
retrieving content in accordance with the input query, resulting in retrieved content;
displaying the retrieved content in one or more UI cards showing plural visualizations based on the retrieved content, including a first visualization and a second visualization, wherein the first visualization is characterized by plural data dimensions, wherein the second visualization is characterized by a filtered version of the plural data dimensions, wherein the first visualization and the second visualization are displayed simultaneously on a display screen of a user, and wherein at least one of the UI cards is flippable to reveal additional information on the back of the flipped UI card, wherein the additional information is additional relative to the retrieved information;
providing a second UI control suitable to enable the user to rate a usefulness of one or more of the first visualization or the second visualization; and
determining which of the one or more UI cards the user prefers based on the rate of the usefulness.

12. The method of claim 11, wherein the second UI control is adapted to facilitate enabling a user to dismiss the first visualization, such that a first UI card that includes the first visualization is removed from a UI display screen in which it was displayed.

13. The method of claim 12, further including:
detecting when the second UI control is used for dismissing the first visualization; and
augmenting context information usable by a software application to facilitate estimating a usefulness of the first UI card based on the dismissing of the first visualization.

14. The method of claim 13, further including:
collecting visualization dismissal information and selection information from plural users of the software application or instances thereof, wherein the software application facilitatesimplementing the method of claim 1; and
using the dismissal information and selection information to affect subsequently displayed retrieved content representing query search results.

15. The method of claim 13, further including providing a third UI control for enabling flipping of the first UI card.

16. The method of claim 13, further including providing a fourth UI control for facilitating enabling a user to provide an annotation associated with the first UI card.

17. The method of claim 13, further including providing a fifth UI control for facilitating enabling a first user to share the first visualization and the second visualization, comprising displayed content, with one or more additional users the software application.

18. The method of claim 17, wherein the one or more additional users of the software application represent one or more surrounding or nearby users of instances of the software application, wherein the one or more additional users are within communication range of the first user, wherein the communication range is determined by a range of Wi-Fi or Bluetooth used by a first communication device of the first user.

19. The method of claim 18, further including selectively filtering content that is shared with the surrounding or nearby users in accordance with one or more data access permissions associated with the one or more surrounding users.

20. An apparatus comprising:
one or more processors; and
logic encoded in one or more tangible media for execution by the one or more processors and when executed operable for:
providing a first User Interface (UI) control for accepting an input query;
retrieving content in accordance with the input query, resulting in retrieved content;
displaying the retrieved content in one or more UI cards showing plural visualizations based on the retrieved content, including a first visualization and a second visualization, wherein the first visualization is characterized by plural data dimensions, wherein the second visualization is characterized by a filtered version of the plural data dimensions, wherein the first visualization and the second visualization are displayed simultaneously on a display screen of a user, and wherein at least one of the UI cards is flippable to reveal additional information on the back of the flipped UI card, wherein the additional information is additional relative to the retrieved information;
providing a second UI control suitable to enable the user to rate a usefulness of one or more of the first visualization or the second visualization; and
determining which of the one or more UI cards the user prefers based on the rate of the usefulness.

* * * * *